(12) United States Patent
Asano et al.

(10) Patent No.: US 7,581,626 B2
(45) Date of Patent: Sep. 1, 2009

(54) DRIVE FORCE TRANSMISSION DEVICE

(75) Inventors: Junichi Asano, Atsugi (JP); Hirotaka Kusukawa, Machida (JP); Osamu Sugitani, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 448 days.

(21) Appl. No.: 11/496,415

(22) Filed: Aug. 1, 2006

(65) Prior Publication Data
US 2007/0034471 A1 Feb. 15, 2007

(30) Foreign Application Priority Data
Aug. 9, 2005 (JP) .............................. 2005-230319
Apr. 25, 2006 (JP) .............................. 2006-120764

(51) Int. Cl.
*F16D 47/04* (2006.01)
*B60K 17/02* (2006.01)

(52) U.S. Cl. .................. 192/48.6; 192/48.4; 192/48.92

(58) Field of Classification Search ................ 192/48.4, 192/48.6, 48.92
See application file for complete search history.

(56) References Cited

U.S. PATENT DOCUMENTS

| 3,165,183 A | * | 1/1965 | Clements | ................ | 192/103 R |
|---|---|---|---|---|---|
| 4,054,065 A | * | 10/1977 | Lemon | ....................... | 192/48.8 |
| 4,782,720 A | | 11/1988 | Teraoka et al. | | |
| 4,787,491 A | * | 11/1988 | Kato | ......................... | 192/48.6 |
| 5,286,239 A | | 2/1994 | Ito et al. | | |
| 2003/0177860 A1 | | 9/2003 | Peura | | |

FOREIGN PATENT DOCUMENTS

| GB | 503661 A | | 4/1939 |
|---|---|---|---|
| JP | 63-186042 A | * | 8/1988 |
| JP | 2004-82869 A | | 3/2004 |

* cited by examiner

*Primary Examiner*—Richard M. Lorence
(74) *Attorney, Agent, or Firm*—Global IP Counselors, LLP

(57) ABSTRACT

A drive force transmission device includes a first direction one-way clutch, a second direction one-way clutch, a second direction rotation transmission clutch, a cam mechanism and a regulating member. The first direction one-way clutch and the second direction one-way clutch are arranged to connect first and second force transmission paths between an input shaft and an output shaft to transmit rotation in first and second rotational directions, respectively. The second direction rotation transmission clutch is arranged to connect the second direction one-way clutch with the output shaft. The regulating member is coupled to the cam mechanism to regulate movement of the cam mechanism to maintain a disengaged state of the second direction rotation transmission clutch. The regulating member is arranged to be non-rotatable in response to rotation of the input shaft in the first rotational direction.

13 Claims, 15 Drawing Sheets

(AUXILIARY DRIVE WHEELS SIDE)                (ELECTRIC MOTOR SIDE)

DRIVE FORCE TRANSMISSION DEVICE

CROSS-REFERENCE TO RELATED APPLICATIONS

This application claims priority under 35 U.S.C. § 119 to Japanese Patent Application Nos. 2005-230319 and 2006-120764. The entire disclosures of Japanese Patent Application Nos. 2005-230319 and 2006-120764 are hereby incorporated herein by reference.

BACKGROUND OF THE INVENTION

1. Field of the Invention

The present invention relates to a drive force transmission device for transferring power between an input shaft and an output shaft.

2. Background Information

Japanese Laid-Open Patent Publication No. 2004-082869 discloses an example of a conventional drive force transmission device. In the drive force transmission device disclosed in this reference, a drive force transmission path for transmitting a drive force from an electric motor to a pair of wheels is provided with a clutch device that is configured and arranged to disconnect the drive force transmission path when the electric motor is in an idle condition. The clutch device includes a first clutch with an overrunning function and a second clutch without an overrunning function. The first clutch is configured and arranged to be engaged to transfer the drive force only when the vehicle is moving forward. The second clutch is configured and arranged to be engaged to transfer the drive torque only when the vehicle is moving in reverse. In other words, the first clutch is a forward-drive one-way clutch and the second clutch is a reverse-drive friction clutch. The clutch device further includes a cam mechanism that engages the second clutch (a friction clutch) when the vehicle is driving in reverse drive. Moreover, a regulating member is provided to regulate movement of the cam mechanism.

In view of the above, it will be apparent to those skilled in the art from this disclosure that there exists a need for an improved drive force transmission device. This invention addresses this need in the art as well as other needs, which will become apparent to those skilled in the art from this disclosure.

SUMMARY OF THE INVENTION

In the conventional driver force transmission device as disclosed in the above mentioned reference, the regulating member slides both during forward drive and during reverse drive to regulate the movement of the cam mechanism. Therefore, transmission loss is increased by the sliding friction of the regulating member.

Accordingly, one object of the present invention is to provide a drive force transmission device that can reduce transmission loss caused by friction.

In order to achieve the above object and other objects of the present invention, a drive force transmission device is configured and arranged to transfer a drive force between an input shaft and an output shaft coaxially disposed with the input shaft. The drive force transmission device includes a first direction one-way clutch, a second direction one-way clutch, a second direction rotation transmission clutch, a cam mechanism and a regulating member The first direction one-way clutch includes a first input shaft side and a first output shaft side with the first direction one-way clutch side being configured and arranged to selectively connect a first force transmission path between the input shaft and the output shaft to transmit rotation in a first rotational direction. The second direction one-way clutch includes a second input shaft side and a second output shaft side with the second direction one-way clutch side being configured and arranged to selectively connect a second force transmission path between the input shaft and the output shaft to transmit rotation in a second rotational direction that is opposite to the first rotational direction. The second direction one-way clutch is arranged with respect to the first direction one-way clutch such that the first force transmission path is in parallel with the second force transmission path. The second direction rotation transmission clutch is disposed between the output shaft and the second output shaft side of the second direction one-way clutch to selectively connect the second direction one-way clutch with the output shaft. The cam mechanism is operatively coupled to the second direction rotation transmission clutch to engage the second direction rotation transmission clutch in response to rotation of the input shaft in the second rotational direction. The regulating member is operatively coupled to the cam mechanism to regulate movement of the cam mechanism to maintain a disengaged state of the second direction rotation transmission clutch with the cam mechanism, and the regulating member being arranged to be non-rotatable in response to rotation of the input shaft in the first rotational direction.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
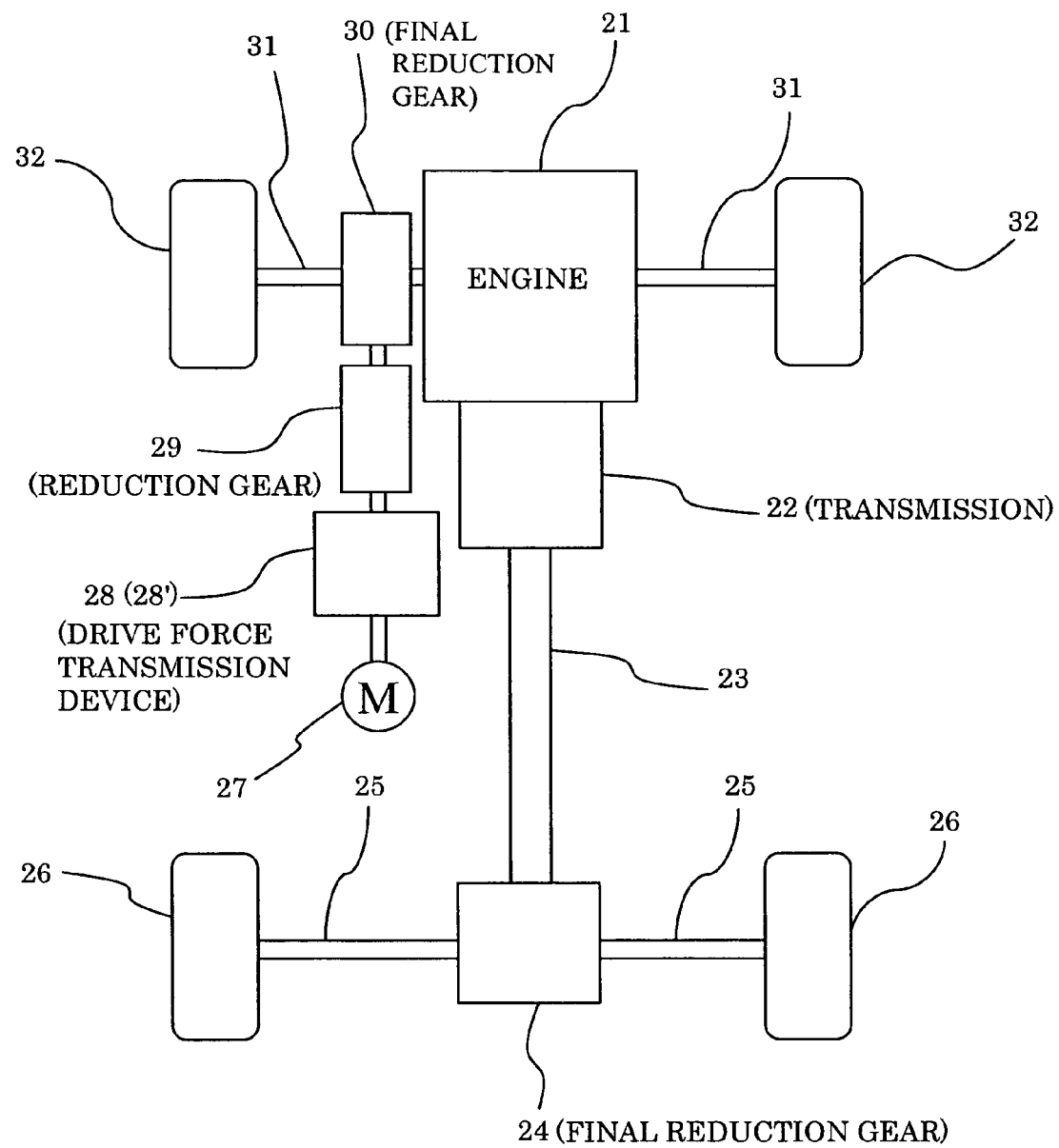
FIG. 1 is a schematic top plan view of one example of a wheel-drive system of an electrically assisted four-wheel-drive vehicle in which an auxiliary drive wheel transmission system is provided with a drive force transmission device in accordance with the present invention.

FIG. 1 is a schematic top plan view of one example of a wheel-drive system of an electrically assisted four-wheel-drive vehicle in which an auxiliary drive wheel transmission system is provided with a drive force transmission device 28 in accordance with the present invention. The drive system of the electrically assisted four-wheel-drive vehicle illustrated in FIG. 1 is a front-engine rear-wheel-drive vehicle (FR vehicle). In this vehicle, the drive force from an engine 21, which is the main power source, is transmitted to a pair of left and right main-drive rear wheels 26 via a reduction gear 22, a propeller shaft 23, a final reduction gear 24 that has a differential gear device, and a pair of left and right drive shafts 25. The drive force of an electric motor 27 is transmitted to a pair of left and right auxiliary-drive front wheels 32 via the drive force transmission device 28 according to the present invention, as well as a reduction gear 29, a final reduction gear 30 having a differential gear device, and a drive shaft 31. The drive force transmission device 28 according to the present invention may also be positioned between the reduction gear 29 and the final reduction gear 30.

Figure 2:
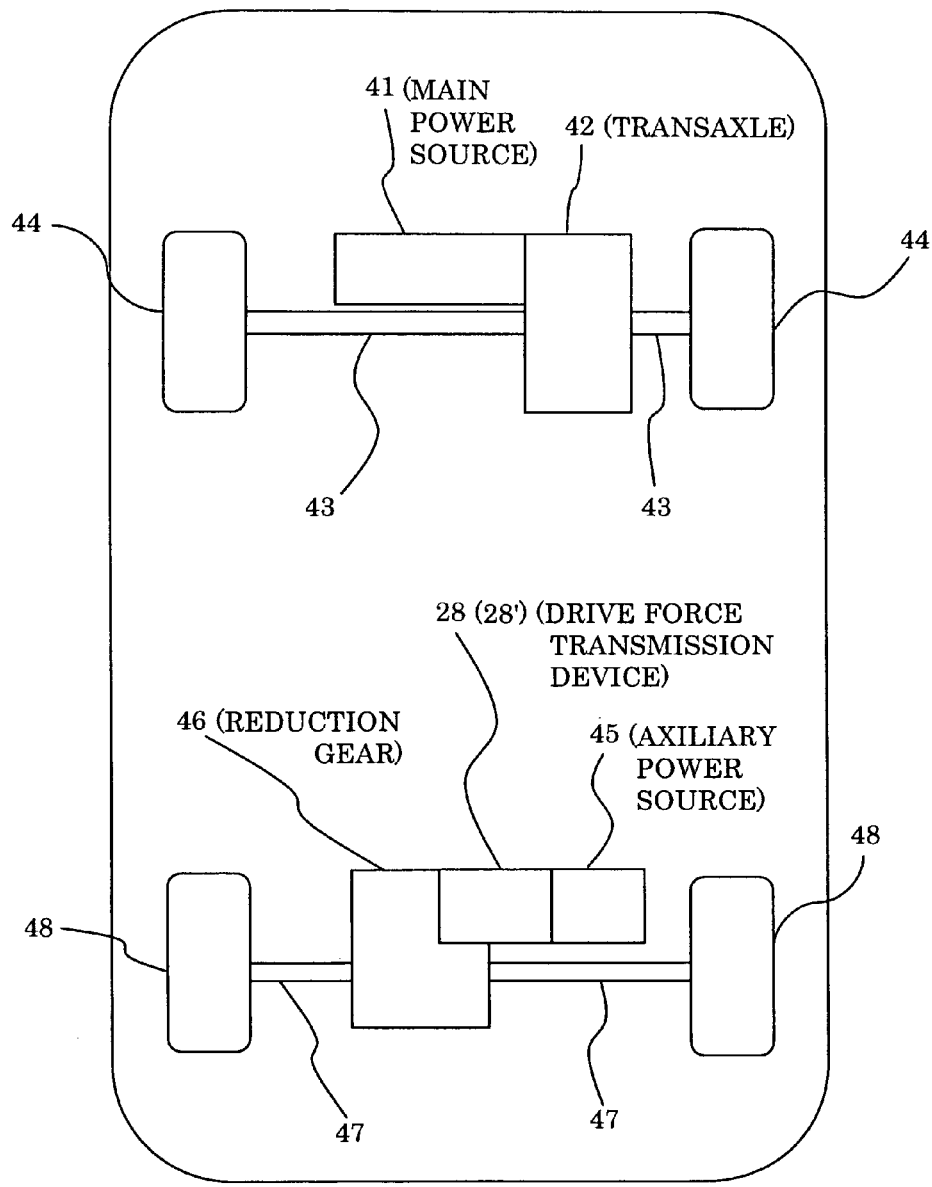
FIG. 2 is a schematic top plan view of another example of a wheel-drive system of an electrically assisted four-wheel-drive vehicle in which an auxiliary drive wheel transmission system is provided with the drive force transmission device in accordance with the present invention.

FIG. 2 is a schematic top plan view of another example of a wheel-drive system of an electrically assisted four-wheel-drive vehicle in which an auxiliary drive wheel transmission system is provided with the drive force transmission device 28 in accordance with the present invention. The drive system for an electrically assisted four-wheel-drive vehicle illustrated in FIG. 2 is a front-engine front-wheel-drive vehicle (FF vehicle). In this vehicle, the drive force from an engine 41 or other main power source is transmitted to a pair of left and right main drive front wheels 44 via a transaxle 42, which is a combination of a transmission and a differential gear device, as well as a drive shaft 43. The drive force from an electric motor 45 or other auxiliary power source is transmitted to a pair of left and right auxiliary-drive rear wheels 48 via the drive force transmission device 28 according to the present invention, as well as a reduction gear 46 having a differential gear device, and a drive shaft 47. The drive force transmission device 28 of the present invention may also be included in the reduction gear 46, and the drive force transmission device 28 of the present invention and the reduction gear 46 may be configured as a single unit.

Figure 3:
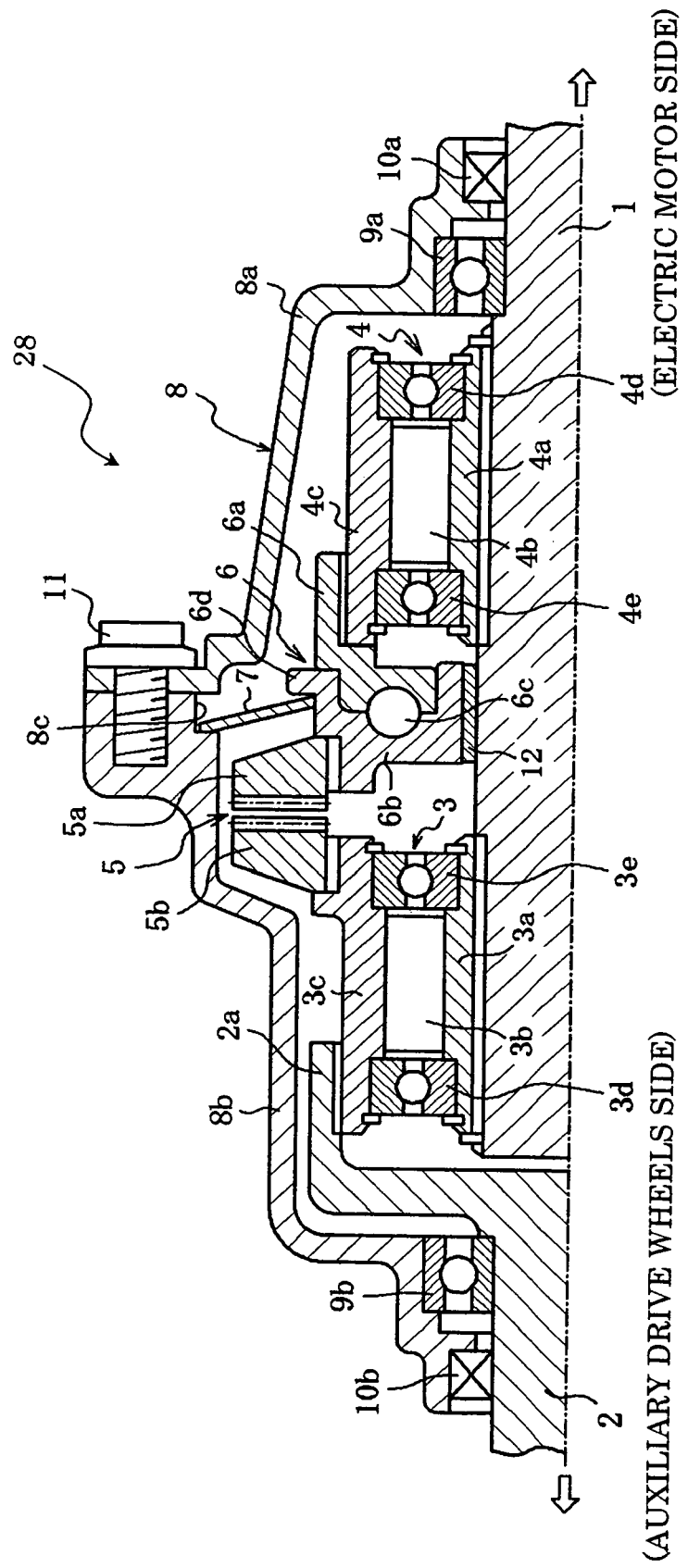
FIG. 3 is a partial longitudinal cross sectional view of a drive force transmission device in accordance with a first embodiment of the present invention.

Referring now to FIGS. 3-9, the drive force transmission device 28 used in the drive systems illustrated in FIGS. 1 and 2 will be explained in more detail in accordance with the first embodiment of the present invention. As seen in FIG. 3, the drive force transmission device 28 includes an input shaft 1 linked to the electric motor 27 (45), and an output shaft 2 linked to the auxiliary drive wheels 32 (48). The input shaft 1 and the output shaft 2 are housed in a casing 8 in a coaxially abutting state. The casing 8 includes a casing part 8a and a casing part 8b, which are joined together by a bolt 11.

The input shaft 1 is rotatably supported by a bearing 9a to rotate relative to the casing part 8a, and a space between the input shaft 1 and the casing 8a is sealed with an oil seal 10a. The output shaft 2 is rotatably supported by a bearing 9b to rotate relative to the casing 8b, and a space between the output shaft 2 and the casing 8b is sealed with an oil seal 10b.

As seen in FIG. 3, the drive force transmission device 28 includes a forward one-way clutch (first direction one-way clutch) 3 and a reverse one-way clutch (second direction one-way clutch) 4. The forward one-way clutch 3 and the reverse one-way clutch are fitted together sequentially from the side closest to the output shaft 2 on the outer periphery of an end portion of the input shaft 1 adjacent to the output shaft 2. The forward one-way clutch 3 has a conventional structure including an inner ring 3a (first inner ring of a first input shaft side), an outer ring 3c (first outer ring of a first output shaft side), a plurality of sprags 3b interposed between the inner ring 3a and the outer ring 3c, and a pair of bearings 3d and 3e. The reverse one-way clutch 4 also has a conventional structure including an inner ring 4a (second inner ring of a second input shaft side), an outer ring 4c (second outer ring of a second output shaft side), a plurality of sprags 4b interposed between the inner ring 4a and the outer ring 4c, and a pair of bearings 4d and 4e.

The forward one-way clutch 3 and the reverse one-way clutch 4 are serration-fitted or spline-fitted to the outer periphery of the end portion of the input shaft 1 near the output shaft 2 so that the inner rings 3a and 4a can rotate together with the input shaft 1 but cannot be axially displaced with respect to the input shaft 1. The outer ring 3c of the forward one-way clutch 3 is fitted into the inner periphery of a ring part 2a integrally formed at an end portion of the output shaft 2 near the input shaft 1 as seen in FIG. 3. Therefore, the outer ring 3c of the forward one-way clutch 3 is fixedly coupled to the output shaft 2.

As shown in FIG. 3, the drive force transmission device 28 of the present invention further includes a reverse rotation transmission clutch (second direction rotation transmission clutch) 5 and a cam mechanism 6 that are interposed sequentially from the side closest to the forward one-way clutch 3 between the outer ring 3c of the forward one-way clutch 3 and the outer ring 4c of the reverse one-way clutch 4.

The cam mechanism 6 will be described first. The cam mechanism 6 is a thrust cam mechanism including a first cam disk 6a disposed adjacent to the reverse one-way clutch 4, a second cam disk 6b disposed adjacent to the reverse rotation transmission clutch 5 and a cam follower 6c interposed between the first and second cam disks 6a and 6b. The first cam disk 6a is fixedly coupled to the outer ring 4c of the reverse one-way clutch 4 and rotates together with the outer ring 4c of the reverse one-way clutch 4. The second cam disk 6b faces the first cam disk 6a in the axial direction, and is pressed against the first cam disk 6a by an axial preload imparted by a return spring (regulating member) 7, such as a disc spring and the like.

The cam mechanism 6 is configured and arranged such that, when a drive force in the reverse rotation direction (second rotational direction) is transmitted to the first cam disk 6a of the cam mechanism 6, the second cam disk 6b is displaced in the axial direction away from the first cam disk 6a via the cam follower 6c by the relative rotation between the first cam disk 6a and the second cam disk 6b. The inner periphery of the return spring 7 is caused to interlock with an outer peripheral flange part 6d of the second cam disk 6b, and the outer periphery of the return spring 7 is caused to interlock with the annular groove 8c of the casing part 8b. The return spring 7 is loaded between the second cam disk 6b and the casing part 8b, generating the axial preload that presses the second cam disk 6b against the first cam disk 6a.

The reverse rotation transmission clutch 5 is a dog clutch that has a pair of annular clutch gear members 5a and 5b facing each other in the axial direction with opposing surfaces of the annular clutch gear members 5a and 5b having gears configured and arranged to mesh with each other. The annular clutch gear member 5a is fixedly coupled to the second cam disk 6b so as to rotate together with the second cam disk 6b while the annular clutch gear member 5b is fixedly coupled to the outer ring 3c of the forward one-way clutch 3 so as to rotate together with the outer ring 3c of the forward one-way clutch 3.

The operation of the reverse rotation transmission clutch 5 will be described in more detail below. In the period during which the reverse-direction drive force is not transmitted to the first cam disk 6a, the second cam disk 6b is maintained in a position closer to the first cam disk 6a by the return spring 7. Therefore, the reverse rotation transmission clutch 5 is maintained in a disengaged or released position and the outer rings 3c and 4c of the forward and reverse one-way clutches 3 and 4 are disconnected from each other because the annular clutch gear members 5a and 5b are not engaged, as shown in FIG. 3.

When the reverse-direction drive force is transmitted to the first cam disk 6a, the rotation of the first cam disk 6a in relation to the second cam disk 6b causes the second cam disk 6b to move away from the first cam disk 6a via the cam follower 6c against the preload imparted by the return spring 7. Therefore, the annular clutch gear member 5a is moved leftward from the position shown in FIG. 3 to mesh with the annular clutch gear member 5b, whereby the reverse rotation transmission clutch 5 is engaged and the outer rings 3c and 4c of the one-way clutches 3 and 4 are connected to each other.

Accordingly, the forward one-way clutch 3 and the reverse one-way clutch 4 are disposed in parallel between the input shaft 1 and the output shaft 2. The reverse one-way clutch 4 is configured and arranged to link the input and output shafts 1 and 2 via the reverse rotation transmission clutch 5 and the outer ring 3c of the forward one-way clutch 3 engaged by the cam mechanism 6 when the reverse-direction drive force is transmitted to the input shaft 1.

The operation of the drive force transmission device 28 of the first embodiment when used in the electrically assisted four-wheel-drive vehicles as shown in FIGS. 1 and 2 will now be described in more detail.

Figure 4:
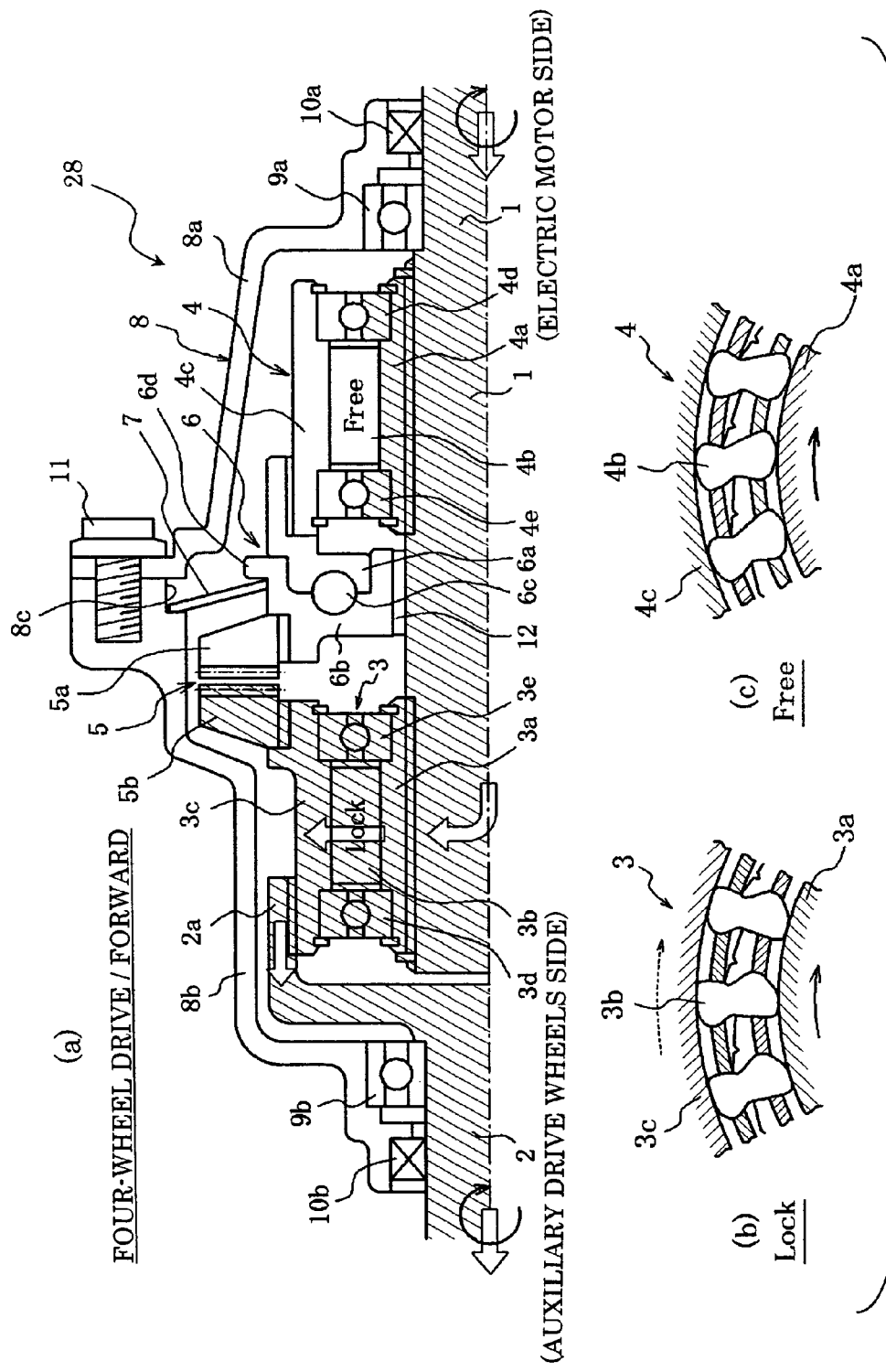
FIG. 4 is a series of schematic diagrams of the drive force transmission device in accordance with the first embodiment of the present invention illustrating a state in which the electrically assisted four-wheel-drive vehicle is driven forward under a four-wheel drive condition wherein a diagram (a) is a partial longitudinal cross sectional view illustrating a drive force transmission path in the drive force transmission device, a diagram (b) is a partial transverse cross sectional view of a forward one-way clutch, and a diagram (c) is a partial transverse cross sectional view of a reverse one-way clutch.

A diagram (a) of FIG. 4 is a cross sectional view in which hatching indicates a drive force transmission path in the drive force transmission device 28 when the electrically assisted four-wheel-drive vehicle is driven forward under a four-wheel drive condition.

In this example, the direction of rotation of the input shaft 1 during forward movement under the four-wheel drive condition is explained as the clockwise direction, as viewed from the right side (electric motor side) of the diagram (a) of FIG. 4.

A diagram (b) of FIG. 4 is a transverse partial cross sectional view of the forward one-way clutch 3 as viewed from the right side (electric motor side) of the diagram (a) of FIG.

4. A diagram (c) of FIG. 4 is a transverse cross sectional view of the reverse one-way clutch 4 as viewed from the right side (electric motor side) of the diagram (a) of FIG. 4.

When the forward drive force provided by the electric motor 27 (45) causes the input shaft 1 to rotate in the clockwise direction (first rotational direction), the inner ring 3a of the forward one-way clutch 3 rotates in the direction of interlocking with the outer ring 3c. The sprags 3b therefore tilt in the direction of interlocking, as shown in the diagram (b) of FIG. 4, and the outer ring 3c rotates in the forward direction together with the inner ring 3a in an integrated manner via the sprags 3b by the interlocking (indicated as "lock" in the diagram (b) of FIG. 4) of the forward one-way clutch 3.

The forward drive force provided from the electric motor 27 (45) to the input shaft 1 is thereby transmitted directly to the output shaft 2 via the forward one-way clutch 3, enabling the auxiliary drive wheels 32 (48) to be driven in the forward direction by the electric motor 27 (45), and the vehicle to be driven forward under the four-wheel drive condition in combination with the engine-powered forward drive of the main drive wheels 26 (44).

The forward rotation of the input shaft 1 is also transmitted to the inner ring 4a of the reverse one-way clutch 4, but the direction of rotation of the inner ring 4a is a direction in which the inner ring 4a and the outer ring 4c are not interlocked. Therefore, the sprags 4b tilt in the direction in which there is no interlocking, as shown in the diagram (c) of FIG. 4. Thus, the inner ring 4a merely rotates idly with respect to the outer ring 4c as a result of the reverse one-way clutch 4 not being interlocked (indicated as "free" in the diagram (c) of FIG. 4). Accordingly, no forward rotation is transmitted to the outer ring 4c of the reverse one-way clutch 4.

The non-interlocked state of the reverse one-way clutch 4 prevents the forward rotation of the input shaft 1 from being transmitted to the outer ring 4c, and thus, to the first cam disk 6a of the cam mechanism 6. Therefore, no relative rotation occurs between the cam disks 6a and 6b of the cam mechanism 6, and the cam mechanism 6 is not operated and the state of the cam mechanism 6 shown in the diagram (a) of FIG. 4 is maintained. Thus, no friction is generated between the second cam disk 6b of the cam mechanism 6 and the return spring 7.

Figure 5:
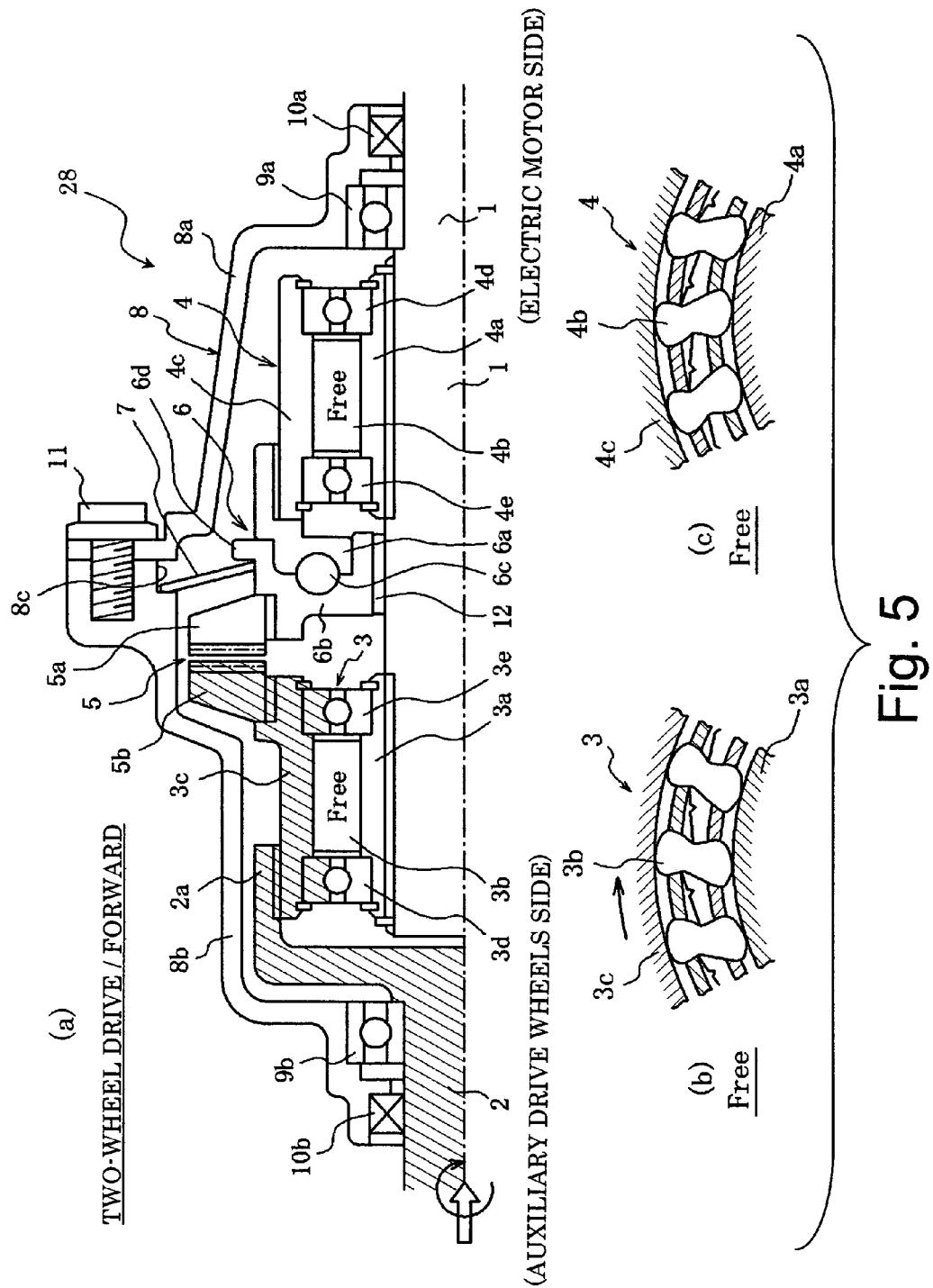
FIG. 5 is a series of schematic diagrams of the drive force transmission device in accordance with the first embodiment of the present invention illustrating a state in which the electrically assisted four-wheel-drive vehicle is driven forward under a two-wheel drive condition wherein a diagram (a) is a partial longitudinal cross sectional view illustrating a drive force transmission path in the drive force transmission device, a diagram (b) is a partial transverse cross sectional view of a forward one-way clutch, and a diagram (c) is a partial transverse cross sectional view of a reverse one-way clutch.

A diagram (a) of FIG. 5 is a cross sectional view of the drive force transmission device 28 in which hatching indicates a drive force transmission path in the drive force transmission device 28 when an electric four-wheel-drive vehicle is driven forward under the two-wheel drive condition.

In this example, the direction of rotation of the output shaft 2 during forward movement under the four-wheel drive condition is explained as the clockwise direction, as viewed from the right side (electric motor side) of the diagram (a) of FIG. 5.

A diagram (b) of FIG. 5 is a transverse partial cross sectional view of the forward one-way clutch 3 as viewed from the right side (electric motor side) of the diagram (a) of FIG. 5. A diagram (c) of FIG. 5 is a transverse cross sectional view of the reverse one-way clutch 4 as viewed from the right side (electric motor side) of the diagram (a) of FIG. 5.

When the vehicle is being driven forward under the two-wheel drive condition, the electric motor 27 (45) is stopped, and thus, the auxiliary drive wheels 32 (48) are not driven by the electric motor 27 (45). In such case, the vehicle is propelled solely by the engine-powered two-wheel drive of the main drive wheels 26 (44). Therefore, rotation is not transmitted from the electric motor 27 (45) to the input shaft 1, and the input shaft 1 remains stationary.

However, as mentioned above, the vehicle is propelled by the engine-powered two-wheel drive of the main drive wheels 26 (44). Therefore, rotation of the auxiliary drive wheels 32 (48) is transmitted to the output shaft 2, and the auxiliary drive wheels 32 (48) cause the output shaft 2 to be driven in the direction of the forward rotation (clockwise rotation).

The forward rotation provided by the passive drive of the output shaft 2 reaches the outer ring 3c of the forward one-way clutch 3, as shown in the diagram (a) of FIG. 5, and causes the outer ring 3c to rotate forward (first rotational direction).

However, the forward rotation of the outer ring 3c occurs in the direction in which there is no interlocking between the outer ring 3c and the inner ring 3a. Therefore; the sprags 3b tilt in the direction in which there is no interlocking between the outer ring 3c and the inner ring 3a, as shown in the diagram (b) of FIG. 5. Thus, the outer ring 3c merely rotates idly with respect to the inner ring 3a, and thus, the forward one-way clutch 3 is not interlocked (indicated as "free" in the diagram (b) of FIG. 5). Accordingly, no forward rotation is transmitted to the inner ring 3a from the output shaft 2.

The non-interlocked state of the forward one-way clutch 3 prevents the forward rotation of the output shaft 2 from being transmitted to the inner ring 3a, and hence to the input shaft 1 thus making it possible to prevent power from being lost or the electric motor 27 (45) from being prematurely abraded by motor drag.

The forward rotation of the output shaft 2 is not transmitted to the first cam disk 6a of the cam mechanism 6, nor does relative rotation occur between the cam disks 6a and 6b. The cam mechanism 6 is therefore not operated and the state of the cam mechanism 6 shown in the diagram (a) of FIG. 5 is maintained. Therefore, no friction is generated between the second cam disk 6b of the cam mechanism 6 and the return spring 7.

Figure 6:
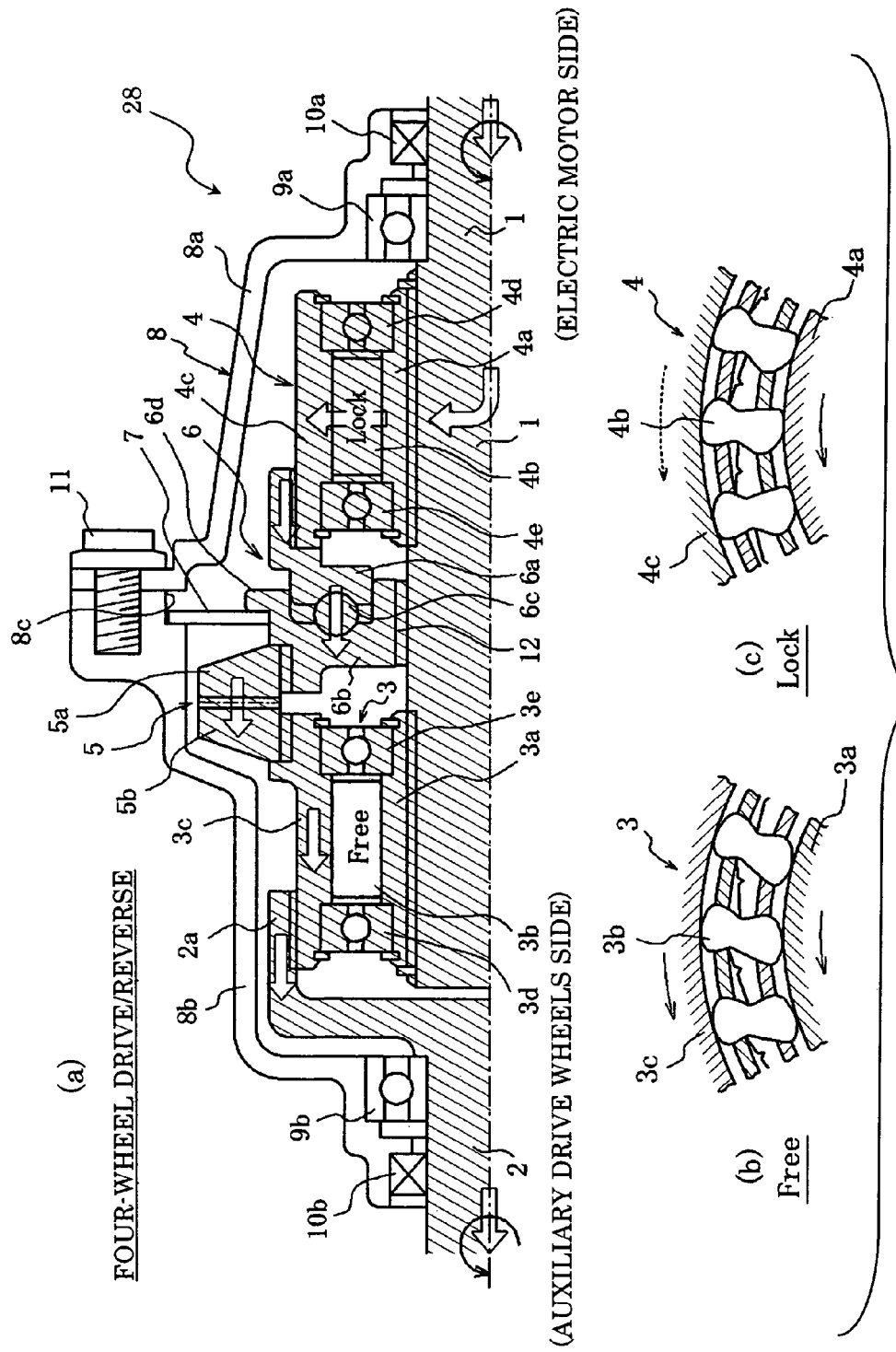
FIG. 6 is a series of schematic diagrams of the drive force transmission device in accordance with the first embodiment of the present invention illustrating a state in which the electrically assisted four-wheel-drive vehicle is driven in reverse under the four-wheel drive condition wherein a diagram (a) is a partial longitudinal cross sectional view illustrating a drive force transmission path in the drive force transmission device, a diagram (b) is a partial transverse cross sectional view of a forward one-way clutch, and a diagram (c) is a partial transverse cross sectional view of a reverse one-way clutch.

A diagram (a) of FIG. 6 is a cross sectional view in which hatching indicates a drive force transmission path in the drive force transmission device 28 when the electrically assisted four-wheel-drive vehicle is driven in reverse under the four-wheel drive condition.

In this example, the direction of rotation of the input shaft 1 during reverse movement under the four-wheel drive condition is explained as the counter-clockwise direction, as viewed from the right side (electric motor side) of the diagram (a) of FIG. 6.

A diagram (b) of FIG. 6 is a transverse partial cross sectional view of the forward one-way clutch 3 as viewed from the right side (electric motor side) of the diagram (a) of FIG. 6. A diagram (c) of FIG. 6 is a transverse cross sectional view of the reverse one-way clutch 4 as viewed from the right side (electric motor side) of the diagram (a) of FIG. 6.

When the reverse drive force provided by the electric motor 27 (45) causes the input shaft 1 to rotate in the reverse direction (second rotational direction), the inner ring 4a of the reverse one-way clutch 4 rotates in the direction of interlocking with the outer ring 4c. Therefore, the sprags 4b tilt in the direction of interlocking, as shown in the diagram (c) of FIG. 6, and the outer ring 4c rotates in the reverse direction together with the inner ring 4a in an integrated manner via the sprags 4b by the interlocking (indicated as "lock" in the diagram (c) of FIG. 6) of the reverse one-way clutch 4.

The reverse drive force provided by the electric motor 27 (45) to the input shaft 1 is thereby transmitted to the first cam disk 6a of the cam mechanism 6, and the rotation of the first cam disk 6a in relation to the second cam disk 6b causes the second cam disk 6b to move away from the first cam disk 6a in the axial direction by the cam follower 6c against the preload imparted by the return spring 7, as shown in the diagram (a) of FIG. 6.

The axial displacement of the second cam disk 6b causes the annular clutch gear member 5a of the reverse rotation transmission clutch 5 to move leftward in the drawing and mesh with the annular clutch gear member 5b when the cam mechanism 6 is operated as shown in the diagram (a) of FIG. 6. The reverse rotation transmission clutch 5 is engaged, and the outer rings 3c and 4c of the one-way clutches 3 and 4 are connected to each other.

The reverse drive force provided by the electric motor 27 (45) to the input shaft 1 is thereby transmitted directly to the output shaft 2 via the outer ring 3c of the forward one-way clutch 3, the reverse one-way clutch 4, the cam mechanism 6, and the reverse rotation transmission clutch 5. Therefore, the auxiliary drive wheels 32 (48) are driven in the reverse direction by the electric motor 27 (45), and the vehicle is driven in reverse under the four-wheel drive condition in combination with the engine-powered reverse drive of the main drive wheels 26 (44).

The reverse rotation of the input shaft 1 is also transmitted to the inner ring 3a of the forward one-way clutch 3, but the direction and rate of rotation of the inner ring 3a are the same as those of the outer ring 3c. Therefore, the sprags 3b tilt in a direction in which there is no interlocking between the inner ring 3a and the outer ring 3c as shown in the diagram (b) of FIG. 6. Thus, the forward one-way clutch 3 is kept in a non-interlocked state (indicated as "free" in the diagram (b) of FIG. 6), and the forward one-way clutch 3 does not transmit the drive force between the inner ring 3a and the outer ring 3c.

When the reverse drive force of the input shaft 1 is directed toward the output shaft 2 (when the vehicle is driven in reverse under the four-wheel drive condition), the reverse drive force is transferred via the second cam disk 6b of the cam mechanism 6, as has been described hereinabove. Accordingly, the second cam disk 6b rotates with respect to the return spring 7 that is set on the casing part 8b, causing friction to be generated between the second cam disk 6b and the return spring 7. The vehicle will be driven in reverse when the reverse drive force of the input shaft 1 is directed toward the output shaft 2 (reverse four-wheel drive). Therefore, friction will be generated only infrequently and for very short periods of time. The friction generated between the second cam disk 6b and the return spring 7 will not, to any serious degree, either increase transmission loss or reduce reliability as a result of wear.

In the conventional drive force transmission device as disclosed in the reference mentioned above (Japanese Laid-Open Patent Publication No. 2004-082869), it is necessary to provide a clutch to disconnect between the auxiliary drive wheels and the motor drive system so that the rotation of the auxiliary drive wheels will not be transmitted to the electric motor while the electric motor is stopped under the two-wheel drive condition. However, a problem arises in that if the clutch is an electromagnetic multiple-disk wet clutch, a complex control system is necessary for the clutch to be engaged and released. It is apparent from the description above, however, that such complex control system is not necessary in the drive force transmission device 28 in accordance with the first embodiment of the present invention. Thus, problems arising in relation to the need for a complex control system can be eliminated.

Moreover, in the conventional drive force transmission device, problems of increased noise and cost are presented due to the need for two gears of different specifications in order to operate the cam mechanism. However, it is apparent from the description above that the drive force transmission device 28 in accordance with the first embodiment of the present invention comprises no configuration that increases noise or raises costs, and these problems therefore do not arise.

Figure 7:
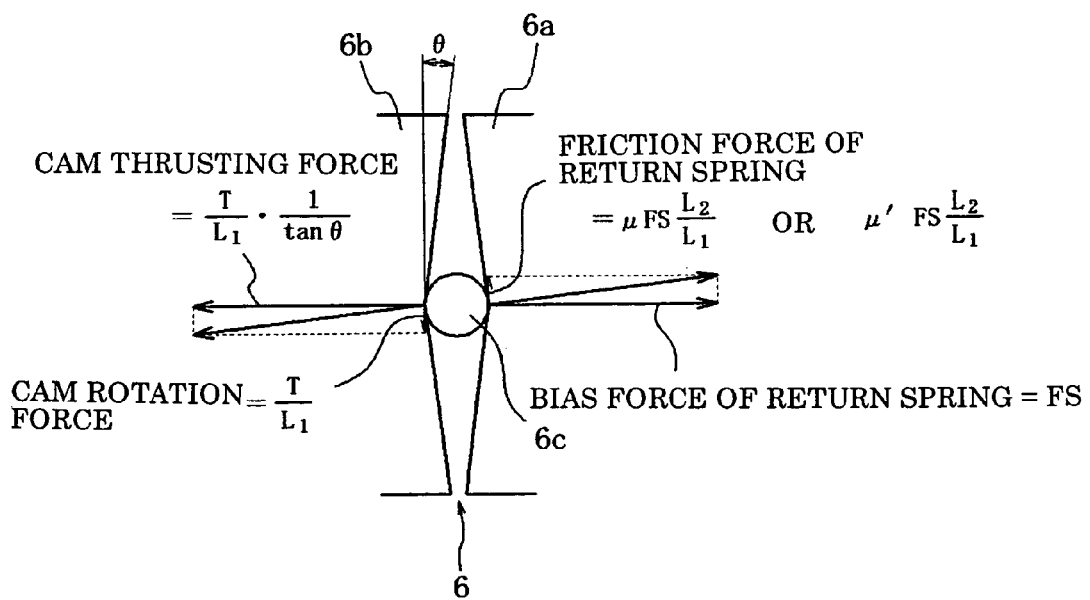
FIG. 7 is a schematic diagram illustrating an operating principle of a cam mechanism used to operate a reverse rotation transmission clutch of the drive force transmission device in accordance with the first embodiment of the present invention.

The cam mechanism 6 configured and arranged to control the engagement and release of the reverse rotation transmission clutch 5 described above will be described in further detail with reference to FIG. 7.

As described above, the cam mechanism 6 includes the first and second cam disks 6a and 6b and the cam follower 6c interposed between the first and second cam disks 6a and 6b. A cam groove is provided on a surface of each of the first and second cam disks 6a and 6b that faces each other in the axial direction so that the cam operation described above can be achieved. FIG. 7 is a schematic diagram illustrating the cam grooves of the first and second cam disks 6a and 6b as viewed from the outer periphery of the cam mechanism 6.

It is necessary to satisfy the following two conditions in order to operate the cam mechanism 6 when static friction is generated between the second cam disk 6b and the return spring 7. In these conditions, T is the drive force applied to the cam mechanism 6, L1 is the distance from the shaft center of the input shaft 1 to the central part of the cam follower 6c, $\theta$ is the cam angle (the angle formed between a perpendicular surface to a center axis of the cam mechanism 6 and the cam grooves) of the cam grooves on the opposing surfaces of the first and second cam disks 6a and 6b, FS is the bias force of the return spring 7, L2 is the inner diameter of the return spring 7, and $\mu$ the coefficient of static friction between the second cam disk 6b and the return spring 7.

First, $T/(L1 \times \tan \theta) > FS$ must be true because the driving force (thrusting force) of the cam mechanism 6 must be larger than the bias force FS of the return spring 7.

Second, $\mu \times FS \times (L2/L1) > T/L1$ must also be true because the friction force between the return spring 7 and the second cam disk 6b must be larger than the cam rotation force derived from dividing the drive force T that operates the cam mechanism 6 by L1.

These equations lead to the relational equation of $FS \times L1 \times \tan \theta < T < \mu \times FS \times L2$, and when static friction exists between the second cam disk 6b and the return spring 7, the cam mechanism 6 is operated when the drive force T that satisfies this equation is applied the cam mechanism 6.

The following conditions must be satisfied in order for the second cam disk 6b to rotate relative to the return spring 7 while the cam mechanism 6 operates. In the conditions, $\nu'$ is the coefficient of dynamic friction between the second cam disk 6b and the return spring 7.

First, $T/(L1 \times \tan \theta) > FS$ must be true because the driving force (thrusting force) of the cam mechanism 6 must be larger than the bias force FS of the return spring 7 in order to satisfy the conditions described above.

Second, $\mu' \times FS \times (L2/L1) = T/L1$ must be true to prevent the cam rotation force from exceeding the friction force between the return spring 7 and the second cam disk 6b.

These equations lead to the relational equation of $\mu' > L1/L2 \times \tan \theta$, and when the second cam disk 6b and the return spring 7 are in a state of dynamic friction, the cam mechanism 6 is operated if the dynamic friction coefficient between the return spring 7 and the second cam disk 6b is greater than or equal to the value of $\mu'$ that satisfies this equation.

The reverse rotation transmission clutch 5 is engaged in a self-locking manner by the operation of the cam mechanism 6, and is self-locked when a drive force is applied to the cam mechanism 6 so that the first cam disk 6a will rotate relative to the second cam disk 6b.

Also, the torque for causing the first cam disk 6a to rotate relative to the second cam disk 6b as described above is no longer present if the drive force is not applied to the cam mechanism 6 in the self-locked state. Therefore, the second cam disk 6b is rotated back to the original relative rotation position by the spring-force of the return spring 7 with respect to the first cam disk 6a while rolling the cam follower 6c to the original position in the cam groove.

As the first cam disk 6a rotates, the second cam disk 6b is displaced so as to approach the first cam disk 6a, causing the annular clutch gear member 5a to separate from the annular clutch gear member 5b and release the reverse rotation transmission clutch 5 by releasing the self-locking.

In the embodiment described above, the reverse rotation transmission clutch 5 includes the dog clutch made of the annular clutch gear members 5a and 5b. However, the reverse rotation transmission clutch 5 can be substituted by any conventional clutch such as a multiple-disk wet clutch 14 as shown in FIG. 8, or a single-disk friction clutch 15 as shown in FIG. 9.

Figure 8:
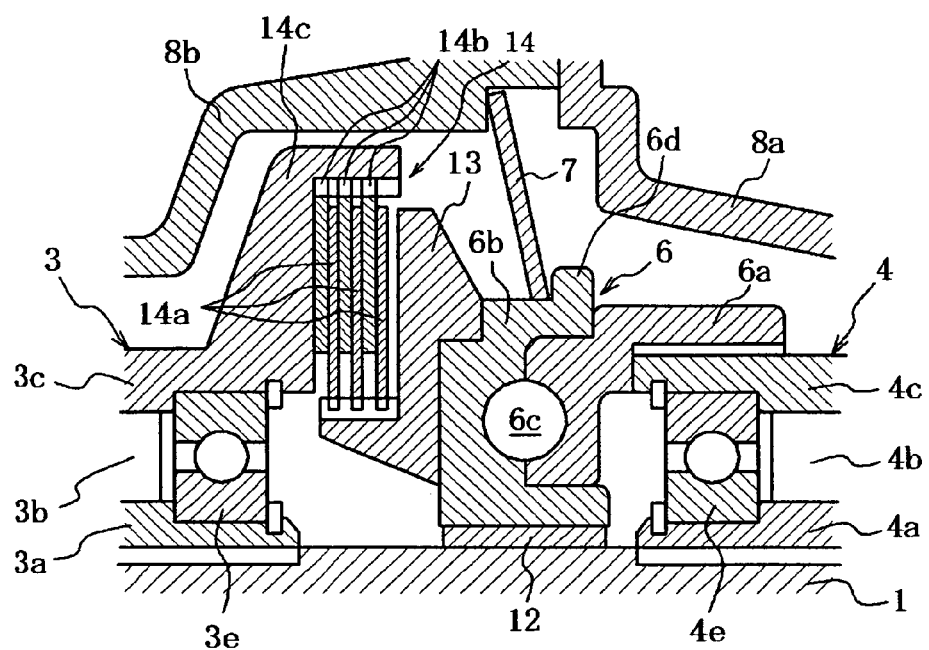
FIG. 8 is a partial longitudinal cross sectional view of a first alternative structure of the reverse rotation transmission clutch of the drive force transmission device in accordance with the first embodiment of the present invention.
Figure 9:
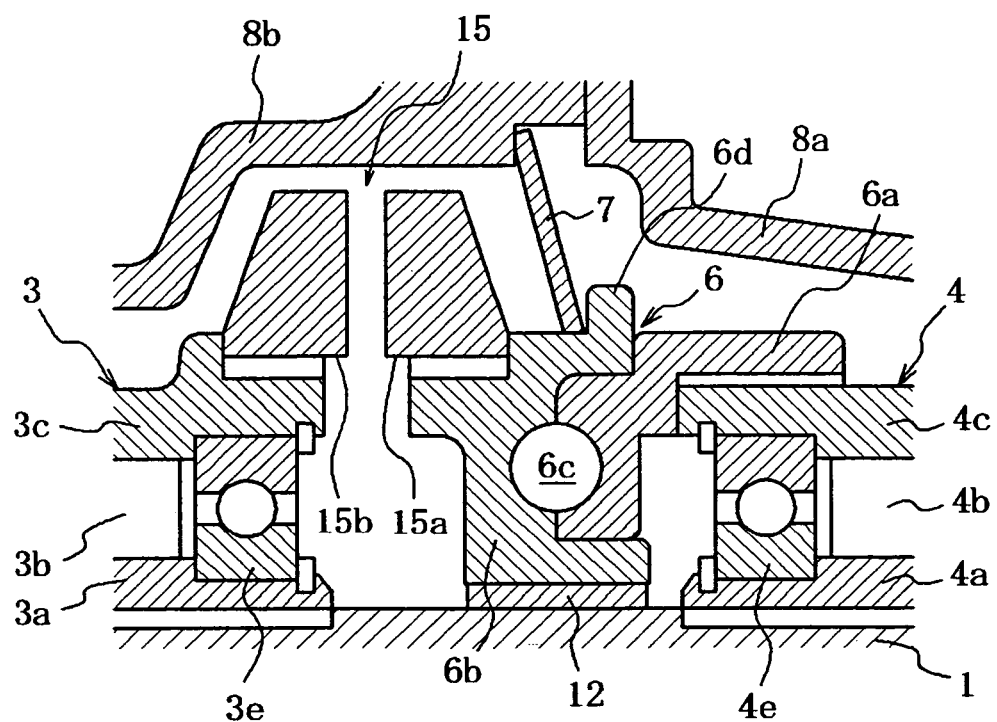
FIG. 9 is a partial longitudinal cross sectional view of a second alternative structure of the reverse rotation transmission clutch of the drive force transmission device in accordance with the first embodiment of the present invention.

If the reverse rotation transmission clutch 5 is substituted by the multiple-disk wet clutch 14 as shown in FIG. 8, a pressure plate 13 is coupled to the second cam disk 6b of the cam mechanism 6, and a clutch drum 14c that is spread open in the direction of the cam mechanism 6 is installed on the outer ring 3c of the forward one-way clutch 3.

A plurality of inner plates 14a and a plurality of outer plates 14b are alternately interposed between the pressure plate 13 and the clutch drum 14c. The inner peripheries of the inner plates 14a are spline-fitted to the pressure plate 13 so as to allow axial displacement, and the outer peripheries of the outer plates 14b are spline-fitted to the inner periphery of the clutch drum 14c so as to allow axial displacement.

The inner plates 14a and the outer plates 14b are clamped between the pressure plate 13 and the clutch drum 14c to engage the multiple-disk wet clutch 14. The multiple-disk wet clutch 14 as a reverse rotation transmission clutch enables the auxiliary drive wheels 32 (48) to be driven in reverse by the electric motor 27 (45) when the pressure plate 13 moves leftward from the release position in FIG. 8 upon the operation of the cam mechanism 6.

If the reverse rotation transmission clutch 5 is substituted by the single-disk friction clutch 15 as shown in FIG. 9, a clutch member 15a is integrally combined with the second cam disk 6b of the cam mechanism 6, and a clutch member 15b is integrally combined with the outer ring 3c of the forward one-way clutch 3.

These clutch members 15a and 15b are placed facing each other, and the respective opposing surfaces of the clutch members 15a and 15b become a pair of clutch surfaces.

The clutch member 15a is pressed against the clutch member 15b to form a coupled (engaged) state. The single-disk friction clutch 15 as a reverse rotation transmission clutch enables the auxiliary drive wheels 32 (48) to be driven in reverse by the electric motor 27 (45) when the clutch member 15a moves leftward from the release position in FIG. 9 upon the operation of the cam mechanism 6.

In the first embodiment illustrated in FIG. 3, the forward one-way clutch 3 and the reverse one-way clutch 4 are explained as sprag-type clutches. However, the forward one-way clutch 3 and the reverse one-way clutch 4 may also be conventional roller-type clutches as shown in diagrams (a) and (b) of FIG. 10.

Figure 10:
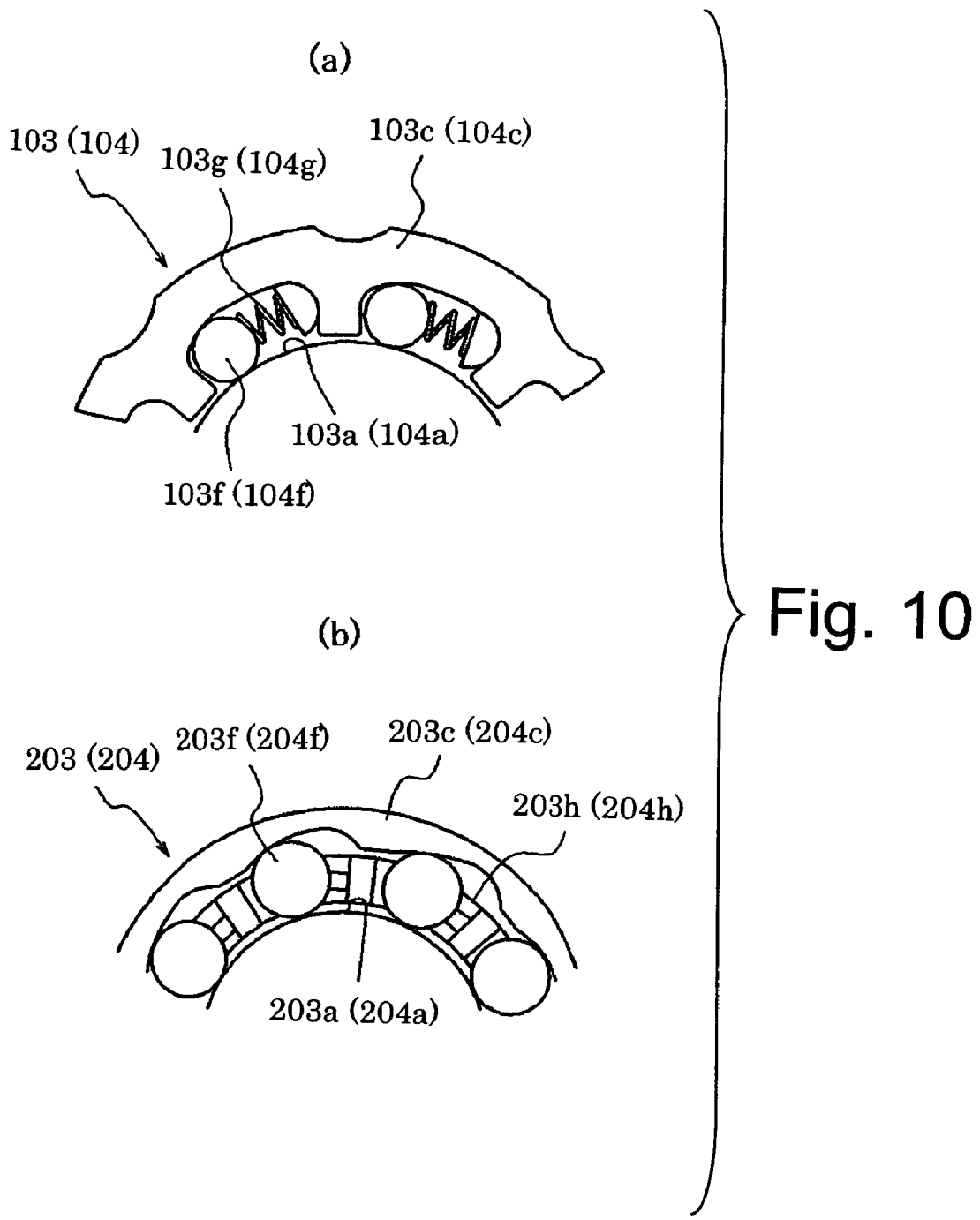
FIG. 10 is a pair of partial front elevational views of alternative structures of the forward one-way clutch and the reverse one-way clutch of the drive force transmission device in accordance with the first embodiment of the present invention, wherein a diagram (a) is a partial front elevational view illustrating a first alternative structure of a one-way clutch in which a spring-held roller is used, and a diagram (b) is a partial front elevational view illustrating a second alternative structure of a one-way clutch in which a cage-held roller is used.

In a forward one-way clutch 103 (or a reverse one-way clutch 104) of the diagram (a) of FIG. 10, a plurality of rollers 103f (104f) are elastically supported in the idling position (depicted in FIG. 10) by a plurality of springs 103g (104g) between an inner ring 103a (104a) and an outer ring 103c (104c). The rollers 103f (104f) are seized between the inner and outer rings 103a (104a) and 103c (104c) to transmit power when the inner and outer rings 103a (104a) and 103c (104c) rotate relative to each other in the direction that causes the rollers 103f (104f) to roll against the springs 103g (104g).

In a forward one-way clutch 203 (or a reverse one-way clutch 204) of the diagram (b) of FIG. 10, a plurality of rollers 203f (204f) are held by a plurality of cages 203h (204h) with a prescribed spacing along the peripheral direction between an inner ring 203a (204a) and an outer ring 203c (204c). The inner and outer rings 203a (204a) and 203c (204c) are engaged by the rollers 203f (204f) to transmit power when the inner and outer rings 203a (204a) and 203c (204c) rotate relative to each other in the direction in which the rollers 203f (204f) are seized between the inner and outer rings 203a (204a) and 203c (204c).

Second Embodiment

Referring now to FIGS. 11 to 16, a drive force transmission device in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

Figure 11:
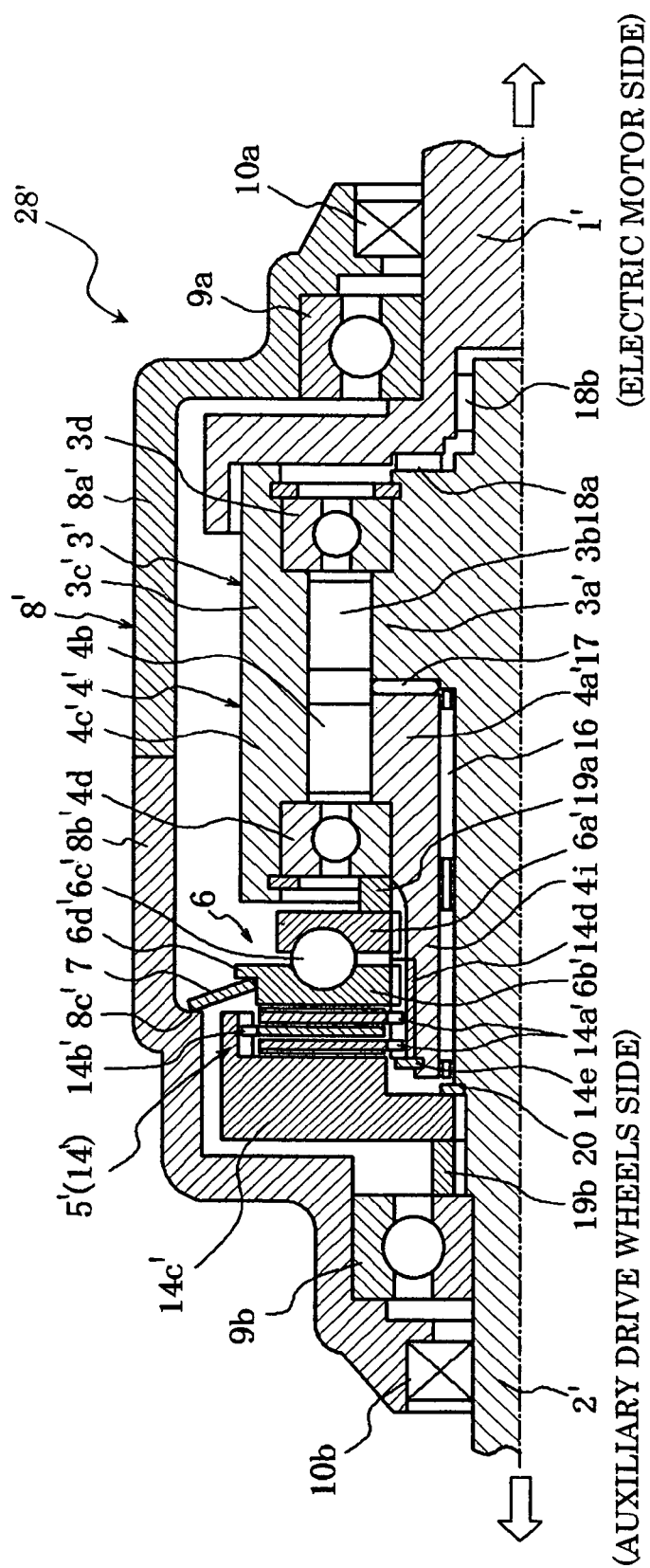
FIG. 11 is a partial longitudinal cross sectional view of a drive force transmission device in accordance with a second embodiment of the present invention.

FIG. 11 is a longitudinal partial cross sectional view of a drive force transmission device 28' in accordance with the second embodiment. Similarly to the drive force transmission device 28 of the first embodiment, the drive force transmission device 28' of the second embodiment can be adapted in the drive systems illustrated in FIGS. 1 and 2. In the second embodiment, an input shaft 1' coupled with the electric motor 27 (45), and an output shaft 2' coupled with the auxiliary drive wheels 32 (48), abut coaxially via a thrust bearing 18a, and are fitted to enable relative rotation by a bushing 18b.

The outer periphery of the output shaft 2' is provided with a forward one-way clutch (first direction one-way clutch) 3' and a reverse one-way clutch (second direction one-way clutch) 4' in the indicated sequence as viewed from the side of the input shaft 1', and the forward and reverse one-way clutches 3' and 4' are placed adjacent to each other to fit to the outer periphery of the output shaft 2' as seen in FIG. 11.

The forward one-way clutch 3' is integrally formed so that an inner ring 3a' (first inner ring of the first output shaft side) rotates together with the output shaft 2'. The diameter of the corresponding end portion of the output shaft 2' is made larger as seen in FIG. 11 so that this larger-diameter portion integrally forms the inner ring 3a' of the forward one-way clutch 3'.

The reverse one-way clutch 4' is fitted to the output shaft 2' via a needle bearing 16 so that an inner ring 4a' (second inner ring of the second output shaft side) thereof can rotate relative to the output shaft 2'.

A thrust bearing 17 is interposed between the inner ring 3a' of the forward one-way clutch 3' and the inner ring 4a' of the reverse one-way clutch 4' so that these inner rings 3a' and 4a' can rotate smoothly relative to each other in the compressed state.

The outer ring 3c' (first outer ring of the first input shaft side) and the outer rings 4c' (second outer ring of the second input shaft side) of the forward one-way clutch 3' and the reverse one-way clutch 4' are integrated into a single unit by being joined or shaped together, and are coupled with the input shaft 1' as seen in FIG. 11. The outer rings 3c' and 4c' of the forward and reverse one-way clutches 3' and 4' are jointly coupled to the electric motor 27 (45) by the input shaft 1'.

The outer rings 3c' and 4c' of the forward and reverse one-way clutches 3' and 4', having been made into a single body as described above, are rotatably supported to on the inner rings 3a' and 4a' using only a pair of bearings 3d and 4d, and the total length in the axial direction of the forward and reverse one-way clutches 3' and 4' can be made shorter than the first embodiment illustrated in FIG. 3.

An end ring portion 4i of the inner ring 4a' of the reverse one-way clutch 4' that is farther from the forward one-way clutch 3' is extended in a direction away from the forward one-way clutch 3'. A reverse rotation transmission clutch 5' and a cam mechanism 6' are interposed between the extended edge of the end ring portion 4i and the output shaft 2'.

The cam mechanism 6' of the second embodiment has the same functions as in the cam mechanism 6 of the first embodiment illustrated in FIG. 3. More specifically, the cam mechanism 6' is a thrust cam mechanism that includes a first cam disk 6a' disposed adjacent to the reverse one-way clutch 4', a second cam disk 6b' disposed adjacent to the reverse rotation transmission clutch 5', and a cam follower 6c'. The first cam disk 6a' is spline-fitted to the inner ring 4a' (i.e., the end ring portion 4i of the inner ring 4a') of the reverse one-way clutch 4' so as to rotate together with the inner ring 4a'. The second cam disk 6b' is pressed by a pre-load provided by the return spring 7 in the axial direction toward the first cam disk 6a'. The cam follower 6c' is disposed between the first and second cam disks 6a' and 6b' and causes the second cam disk 6b' to be displaced away from the first cam disk 6a' when the reverse drive force is transmitted to the first cam disk 6a'.

The inner periphery of the second cam disk 6b' is spline-fitted to the outer periphery of a clutch hub 14d, which is itself fitted to the extended end ring portion 4i of the reverse one-way clutch inner ring 4a' to allow free rotation, and the clutch hub 14d is locked in place with a snap ring 14e fastened around the end ring portion 4i of the reverse one-way clutch inner ring 4a'.

The return spring 7 is the same disc spring as in FIG. 3. The inner periphery of the return spring 7 is interlocked with an outer peripheral flange part 6d' of the second cam disk 6b', and the outer periphery of the return spring 7 is interlocked with an annular groove 8c' of a casing 8'. The return spring 7 is compression-loaded between the second cam disk 6b' and the casing 8'. Thus, the second cam disk 6b' is provided with a pre-load so as to be pressed against the first cam disk 6a' in the axial direction as described above.

The thrusting force of the pre-load reaches the inner ring 3a' through a spacer ring 19a, the bearing 4d, the inner ring 4a', and the thrust bearing 17, and then propagates further to a casing part 8a' through a thrust bearing 18a, the input shaft 1', and the bearing 9a. The inner ring 3a' is therefore not displaced by the above-mentioned pre-load by the return spring 7 in the axial direction.

The reverse rotation transmission clutch 5' of the second embodiment has the following structure, which is basically the same as that of the multiple-disk wet clutch 14 described with reference to FIG. 8.

Specifically, a clutch drum 14c' is disposed closer to the cam mechanism 6' and farther away from the reverse one-way clutch 4', and the inner periphery of the clutch drum 14c' is coupled to the output shaft 2'.

The clutch drum 14c' is sandwiched between a snap ring 20 that is fastened around the output shaft 2' and a spacer ring 19b that is interposed between the clutch drum 14c' and the bearing 9b, thus positioning the clutch drum 14c' on the output shaft 2' in the axial direction.

The second cam disk 6b' is used as the pressure plate of the reverse rotation transmission clutch 5' (multiple-disk wet clutch 14'). Thus, a pair of inner plates 14a' and an outer plate 14b' are alternately interposed between the axially opposing surfaces of the clutch drum 14c' and the second cam disk 6b'.

The inner plates 14a' are spline-fitted to the outer periphery of the clutch hub 14d' configured and arranged to rotate on the end ring portion 4i of the inner ring 4a' of the reverse one-way clutch 4'. Therefore, the inner plates 14a' are configured and arranged to rotate integrally with the second cam disk 6b' and to be displaced with respect to the clutch hub 14d' in the axial direction.

The outer plate 14b' is spline-fitted in a manner that allows the plate to be displaced in the axial direction with respect to the clutch drum 14c'. Thus, the outer plate 14b' is configured and arranged to rotate together with the clutch drum 14c'.

In the second embodiment illustrated in FIG. 11, the forward one-way clutch 3' and the reverse one-way clutch 4' are placed in parallel between the input shaft 1' that is coupled to the electric motor 27 (45), and the output shaft 2' that is coupled to the auxiliary drive wheel 32 (48). Furthermore, the reverse one-way clutch 4' couples the input shaft 1' and the output shaft 2' by the reverse rotation transmission clutch 5', which is engaged by the operation of the cam mechanism 6'. The drive force transmission device 28' of the second embodiment thus configured to operate as described below when used for the electrically assisted four-wheel drive vehicles as shown in FIG. 1 and FIG. 2.

Figure 12:
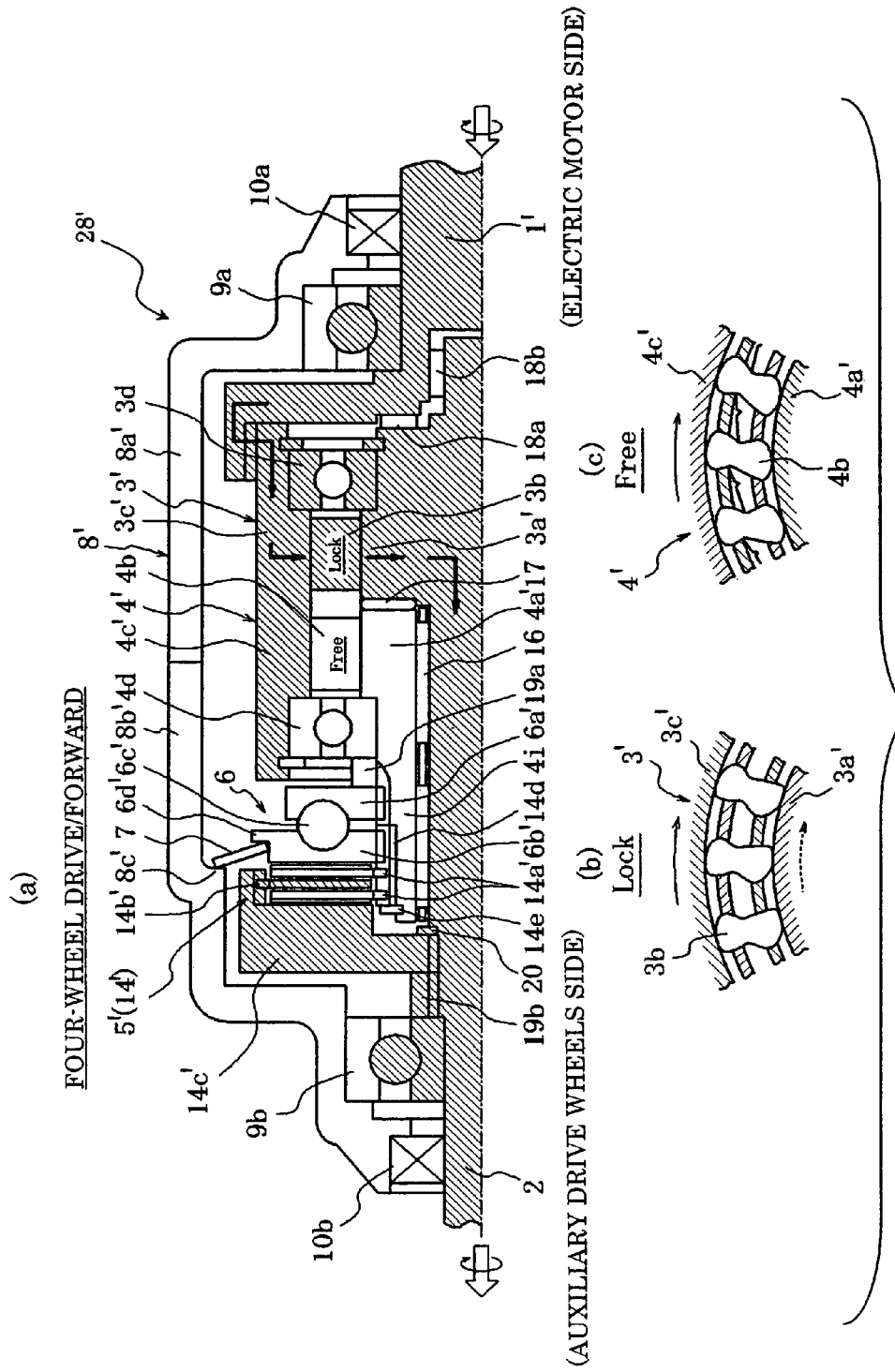
FIG. 12 is a series of schematic diagrams of the drive force transmission device in accordance with the second embodiment of the present invention illustrating a state in which the electrically assisted four-wheel-drive vehicle is driven forward under a four-wheel drive condition wherein a diagram (a) is a partial longitudinal cross sectional view illustrating a drive force transmission path in the drive force transmission device, a diagram (b) is a partial transverse cross sectional view of a forward one-way clutch, and a diagram (c) is a partial transverse cross sectional view of a reverse one-way clutch.

A diagram (a) of FIG. 12 is a cross sectional view in which hatching indicates a drive force transmission path in the drive force transmission device 28' when the electrically assisted four-wheel-drive vehicle is driven forward under a four-wheel drive condition.

In this example, the direction of rotation of the outer rings 3c' and 4c' of the forward one-way clutch 3' and the reverse one-way clutch 4' during forward movement under the four-wheel drive condition is explained as the clockwise direction, as viewed from the right side (electric motor side) of the diagram (a) of FIG. 12.

A diagram (b) of FIG. 12 is a transverse partial cross sectional view of the forward one-way clutch 3' as viewed from the right side (electric motor side) of the diagram (a) of FIG. 12. A diagram (c) of FIG. 12 is a transverse cross sectional view of the reverse one-way clutch 4' as viewed from the right side (electric motor side) of the diagram (a) of FIG. 12.

When the forward drive force provided by the electric motor causes the outer rings 3c' and 4c' of the forward one-way clutches 3' and the reverse one-way clutch 4' to rotate in forward direction (first rotational direction), the outer ring 3c' of the forward one-way clutch 3' rotates in the direction of interlocking with the inner ring 3a'. The sprags 3b of the forward one-way clutch 3' tilt in the direction of interlocking, as shown in the diagram (b) of FIG. 12, and the inner ring 3a' rotates together with the outer ring 3c' in an integrated manner by the sprags 3b in the forward direction by the interlocking (indicated as "lock" in the diagram (b) of FIG. 12) of the forward one-way clutch 3'.

The forward drive force provided by the electric motor 27 (45) to the outer rings 3c' and 4c' of the forward one-way clutch 3' and the reverse one-way clutch 4' is thereby transmitted directly to the output shaft 2' via the forward one-way clutch 3', enabling the auxiliary drive wheels 32 (48) to be driven in the forward direction by the electric motor 27 (45). Thus, the vehicle is driven forward under the four-wheel drive condition in combination with the engine-powered forward drive of the main drive wheels 26 (44).

The forward rotation provided by the electric motor 27 (45) to the outer rings 3c' and 4c' of the forward one-way clutch 3' and the reverse one-way clutch 4' is also transmitted to the outer ring 4c' of the reverse one-way clutch 4', but the direction in which the outer ring 4c' rotates is a direction in which there is no interlocking with the inner ring 4a'. Therefore, the sprags 4b of the reverse one-way clutch 4' tilt in the direction in which there is no interlocking, as shown in the diagram (c) of FIG. 12. The outer ring 4c' merely rotates idly with respect to the inner ring 4a' as a result of the reverse one-way clutch 4' not being interlocked (indicated as "free" in the diagram (c) of FIG. 12). Thus, no forward rotation is transmitted to the inner ring 4a'.

The non-interlocked state of the reverse one-way clutch 4' prevents the forward rotation provided by the electric motor 27 (45) to the outer ring 4c' from being transmitted to the inner ring 4a', and hence to the first cam disk 6a' of the cam mechanism 6'. Therefore, no relative rotation occurs between the cam disks 6a' and 6b'. Thus, the cam mechanism 6' is not operated and the state shown in the diagram (a) of FIG. 12 is maintained. Accordingly, no friction is generated between the second cam disk 6b' of the cam mechanism 6' and the return spring 7.

Figure 13:
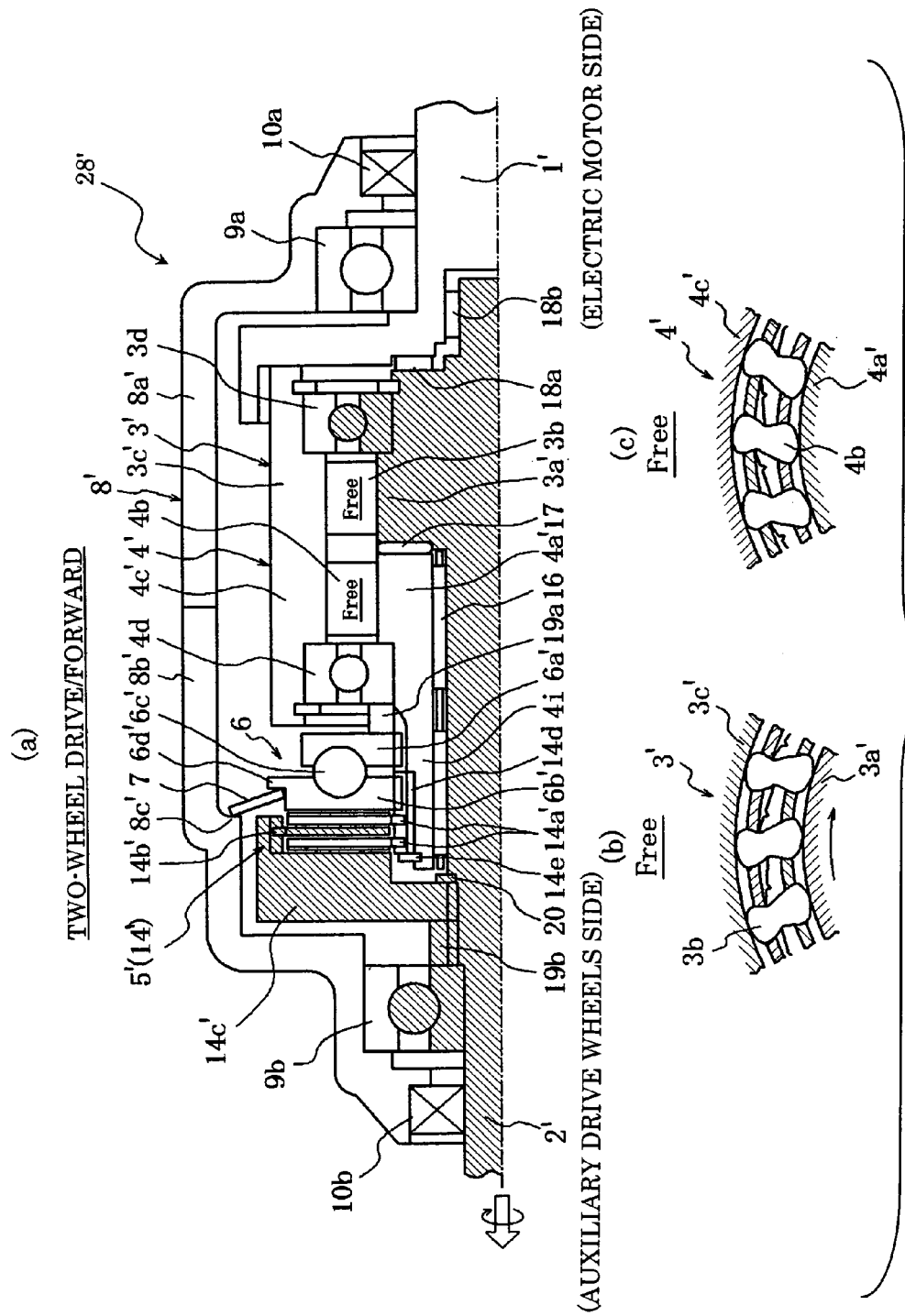
FIG. 13 is a series of schematic diagrams of the drive force transmission device in accordance with the second embodiment of the present invention illustrating a state in which the electrically assisted four-wheel-drive vehicle is driven forward under a two-wheel drive condition wherein a diagram (a) is a partial longitudinal cross sectional view illustrating a drive force transmission path in the drive force transmission device, a diagram (b) is a partial transverse cross sectional view of a forward one-way clutch, and a diagram (c) is a partial transverse cross sectional view of a reverse one-way clutch.

A diagram (a) of FIG. 13 is a cross sectional view of the drive force transmission device 28' in which hatching indicates a drive force transmission path in the drive force transmission device 28' when an electric four-wheel-drive vehicle is driven forward under the two-wheel drive condition.

In this example, the direction of rotation of the output shaft 2' during forward movement under the four-wheel drive condition is explained as the clockwise direction, as viewed from the right side (electric motor side) of the diagram (a) of FIG. 13.

A diagram (b) of FIG. 13 is a transverse partial cross sectional view of the forward one-way clutch 3' as viewed from the right side (electric motor side) of the diagram (a) of FIG. 13. A diagram (c) of FIG. 13 is a transverse cross sectional view of the reverse one-way clutch 4' as viewed from the right side (electric motor side) of the diagram (a) of FIG. 13.

When the vehicle is being driven forward under the two-wheel drive condition, the electric motor 27 (45) is stopped, and thus, the auxiliary drive wheels 32 (48) are not driven by the electric motor 27 (45). In such case, the vehicle is propelled solely by the engine-powered two-wheel drive of the main drive wheels 26 (44). Therefore, rotation is not transmitted from the electric motor 27 (45) to the outer rings 3c' and 4c' of the forward one-way clutch 3' and the reverse one-way clutch 4', and the outer rings 3c' and 4c' remain stationary.

However, as mentioned above, the vehicle is propelled by the engine-powered two-wheel drive of the main drive wheels 26 (44). Therefore, rotation of the auxiliary drive wheels 32 (48) is transmitted to the output shaft 2', and the auxiliary drive wheels 32 (48) cause the output shaft 2' to be driven in the direction of the forward rotation (clockwise rotation).

The forward rotation provided by the reverse drive of the output shaft 2' reaches the inner ring 3a' of the forward one-way clutch 3', as shown in the diagram (a) of FIG. 13, and causes the inner ring 3a' to rotate forward (first rotational direction).

However, the direction of rotation of the inner ring 3a' is a direction in which there is no interlocking with the outer ring 3c'. Therefore, the sprags 3b tilt in the direction in which there is no interlocking, as shown in the diagram (b) of FIG. 13.

Thus, the inner ring 3a' merely rotates idly with respect to the outer ring 3c' as a result of the forward one-way clutch 3' not being interlocked (indicated as "free" in the diagram (c) of FIG. 13). Accordingly, no forward rotation is transmitted to the outer ring 3c' from the output shaft 2'.

The non-interlocked state of the forward one-way clutch 3' prevents forward rotation of the output shaft 2' from being transmitted to the outer ring 3c', and hence to the input shaft 1', thus making it possible to prevent power from being lost or the electric motor 27 (45) from being prematurely abraded by motor drag.

The forward rotation of the output shaft 2' is not transmitted to the first cam disk 6a' of the cam mechanism 6', nor does relative rotation occur between the first and second cam disks 6a' and 6b'. The cam mechanism 6' is therefore not operated and the state of the cam mechanism 6' shown in the diagram (a) of FIG. 13 is maintained. Therefore, no friction is generated between the second cam disk 6b' and the return spring 7.

Figure 14:
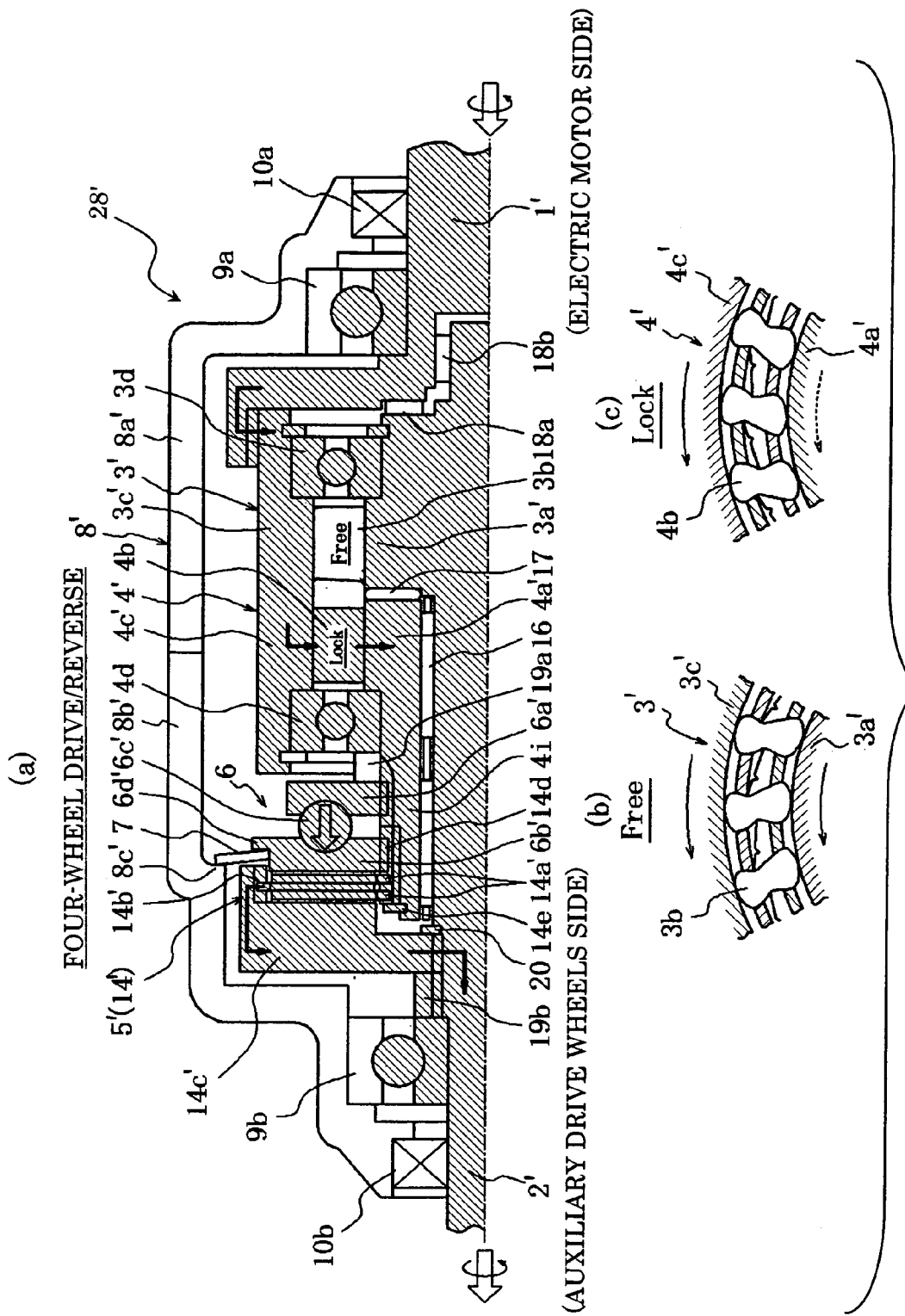
FIG. 14 is a series of schematic diagrams of the drive force transmission device in accordance with the second embodiment of the present invention illustrating a state in which the electrically assisted four-wheel-drive vehicle is driven in reverse under the four-wheel drive condition wherein a diagram (a) is a partial longitudinal cross sectional view illustrating a drive force transmission path in the drive force transmission device, a diagram (b) is a partial transverse cross sectional view of a forward one-way clutch, and a diagram (c) is a partial transverse cross sectional view of a reverse one-way clutch.

A diagram (a) of FIG. 14 is a cross sectional view in which hatching indicates a drive force transmission path in the drive force transmission device 28' when the electrically assisted four-wheel-drive vehicle is driven in reverse under the four-wheel drive condition.

In this example, the direction of rotation of the outer rings 3c' and 4c' during reverse movement under the four-wheel drive condition is explained as the counter-clockwise direction, as viewed from the right side (electric motor side) of the diagram (a) of FIG. 14.

A diagram (b) of FIG. 14 is a transverse partial cross sectional view of the forward one-way clutch 3' as viewed from the right side (electric motor side) of the diagram (a) of FIG. 14. A diagram (c) of FIG. 14 is a transverse cross sectional view of the reverse one-way clutch 4' as viewed from the right side (electric motor side) of the diagram (a) of FIG. 14.

When the reverse drive force provided by the electric motor 27 (45) causes the outer rings 3c' and 4c' to rotate in the reverse direction (second rotational direction), the outer ring 4c' of the reverse one-way clutch 4' rotates in the direction of interlocking with the inner ring 4a'. Therefore, the sprags 4b tilt in the direction of interlocking, as shown in the diagram (c) of FIG. 14, and the inner ring 4a' rotates in the reverse direction together with the outer ring 4c' in an integrated manner via the sprags 4b by the interlocking (indicated as "lock" in the diagram (c) of FIG. 14) of the reverse one-way clutch 4'.

The reverse drive force provided by the electric motor to the outer rings 3c' and 4c' is thereby transmitted via the reverse one-way clutch 4' to the first cam disk 6a' of the cam mechanism 6', and the rotation of the first cam disk 6a' in relation to the second cam disk 6b' causes the second cam disk 6b' to move away from the first cam disk 6a' in the axial direction against the pre-load of the return spring 7 via the cam follower 6c', as shown in the diagram (a) of FIG. 14.

The axial direction displacement of the second cam disk 6b' causes the inner plates 14a' and outer plate 14b' to be clamped against the clutch drum 14c', and the reverse rotation transmission clutch 5' to be engaged when the cam mechanism 6' is operated. The reverse drive force that reaches the inner ring 4a' from the outer ring 4c' via the reverse one-way clutch 4' can thus be transmitted to the output shaft 2' sequentially via the cam mechanism 6' and the reverse rotation transmission clutch 5'.

The reverse drive force provided by the electric motor 27 (45) to the outer rings 3c' and 4c' is thereby transmitted directly to the output shaft 2' via the reverse one-way clutch 4', the cam mechanism 6', and the reverse rotation transmission clutch 5', enabling the auxiliary drive wheels 32 (48) to be driven in the reverse direction by the electric motor 27 (45), and the vehicle to be driven in reverse under the four-wheel drive condition in combination with the engine-powered reverse drive of the main drive wheels 26 (44).

The inner ring 3*a*' of the forward one-way clutch 3' also rotates in the reverse direction together with the output shaft 2' during this time, but the direction and rate of rotation of the inner ring 3*a*' are the same as those of the outer ring 3*c*'. Therefore, the sprags 3*b* tilt in a direction in which there is no interlocking, as shown in the diagram (b) of FIG. 14. The forward one-way clutch 3' is kept in a non-interlocked state (indicated as "free" in the diagram (b) of FIG. 14), and the forward one-way clutch 3' does not transmit power between the inner ring 3*a*' and outer ring 3*c*'.

However, the output shaft 2' and the inner ring 3*a*' perform the same rotation, causing the inner ring 3*a*' and outer ring 3*c*' of the forward one-way clutch 3' to rotate as a single unit, as shown by the arrow in the diagram (b) of FIG. 14. The balls within the bearing 3*d* and the sprags 3*c* between the inner and outer rings 3*a*' and 3*b*' also perform the same rotation, as shown by the hatching in the diagram (a) of FIG. 14.

When the reverse drive force provided by the electric motor 27 (45) to the outer rings 3*c*' and 4*c*' is directed toward the output shaft 2' (when the vehicle is driven in reverse under the four-wheel drive condition), the reverse drive force is transferred via the second cam disk 6*b*' of the cam mechanism 6', as described above. Accordingly, the second cam disk 6*b*' rotates relative to the return spring 7 that is set on the casing 8', causing friction to be generated between the return spring 7 and the second cam disk 6*b*'. The vehicle will be driven in reverse when the reverse drive force provided by the electric motor 27 (45) to the outer rings 3*c*' and 4*c*' is directed toward the output shaft 2' (reverse four-wheel drive condition). Therefore, friction will be generated only infrequently and for very short periods of time. The friction generated between the second cam disk 6*b*' and the return spring 7 will not reduce reliability as a result of wear or increase transmission loss to a level at which problems are encountered.

In the second embodiment described with reference to FIGS. 11 through 14, the reverse rotation transmission clutch 5' is configured and arranged as the same wet-type multiple-plate clutch shown in FIG. 8.

Figure 15:
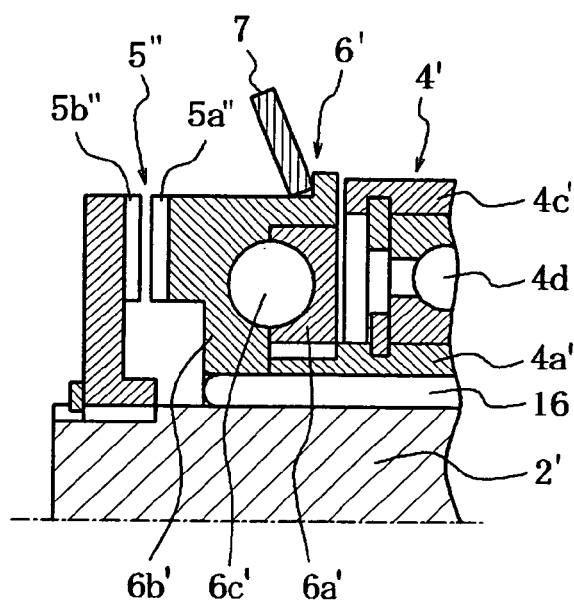
FIG. 15 is a partial longitudinal cross sectional view of a first alternative structure of the reverse rotation transmission clutch of the drive force transmission device in accordance with the second embodiment.
Figure 16:
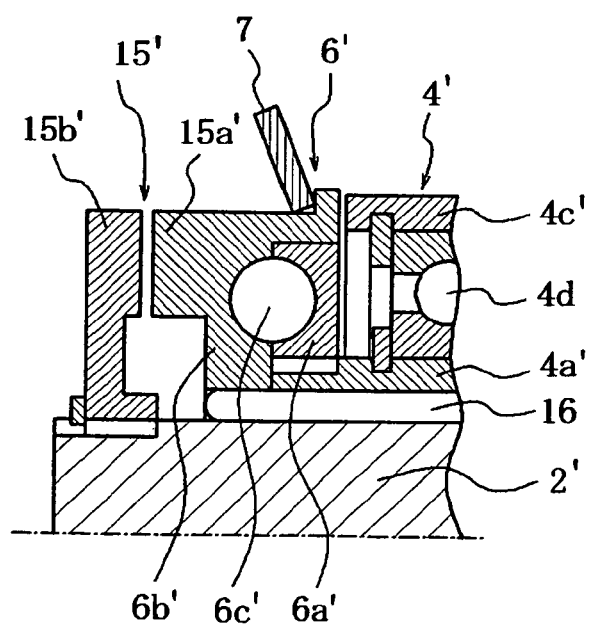
FIG. 16 is a partial longitudinal cross sectional view of a second alternative structure of the reverse rotation transmission clutch of the drive force transmission device in accordance with the second embodiment.

However, the reverse rotation transmission clutch 5' can be substituted by a dog clutch 5" as shown in FIG. 15, a friction clutch 15' as shown in FIG. 16, or a clutch of any other configuration.

If the reverse rotation transmission clutch 5' is substituted by the dog clutch 5" of a type similar to that described in the first embodiment shown in FIG. 3, an annular clutch gear member 5*a*" will be integrally shaped or integrally coupled with a surface of the second cam disk 6*b*' that is farther away from the first cam disk 6*a*' as seen in FIG. 15. An annular clutch gear member 5*b*" will be provided so as to be disposed facing the annular clutch gear member 5*a*", and the inner periphery of the annular clutch gear member 5*b*" will be rotatably interlocked with the output shaft 2' without the ability to be axially displaced, as shown in FIG. 15.

In the dog clutch 5" as a reverse rotation transmission clutch, moving the second cam disk 6*b*' leftward from the release position in FIG. 15 during the operation of the cam mechanism 6' causes the annular clutch gear member 5*a*" to mesh with the annular clutch gear member 5*b*" and to become engaged. Thus, the auxiliary drive wheels 32 (48) are driven in reverse by the electric motor 27 (45).

If the reverse rotation transmission clutch 5' is substituted by the friction clutch 15' of a type such as is shown in FIG. 16, a clutch member 15*a*' will be integrally shaped or integrally coupled with a surface of the second cam disk 6*b*' that is farther away from the first cam disk 6*a*'. A clutch member 15*b*' will be provided so as to be disposed facing the clutch member 15*a*', and the inner periphery of the clutch member 15*b*' will be rotatably interlocked with the output shaft 2' without the ability to be axially displaced.

In the friction clutch 15' as a reverse rotation transmission clutch, moving the clutch member 15*a*' leftward from the release position in FIG. 16 during the operation of the cam mechanism 6' will press the clutch member 15*a*' against the clutch member 15*b*' and to become engaged. Thus, the auxiliary drive wheels 32 (48) are driven in reverse by the electric motor 27 (45).

As is apparent from the description of operation given above, the forward driving modes of the electrically powered four-wheel drive vehicle under the four-wheel drive condition and under the two-wheel drive condition, or the reverse driving mode under the four-wheel drive condition can be achieved using the automatic action of an internal mechanism in the drive force transmission device 28 or 28' of the present invention according to the first or second embodiment. No complicated control mechanisms or control systems are required, and significant advantages can be realized in terms of cost and maintenance.

Although the cam mechanism 6 or 6' requires a spring member (return spring 7) that reduces reliability through wear and increases transmission loss through friction, the cam mechanism 6 or 6' functions only when the drive force is transmitted in the reverse direction (reverse rotation), and is thus used very infrequently and for very short periods of time. Accordingly, substantially few problems will be presented in regard to increased transmission loss through friction or reduced reliability through wear.

The cam mechanism 6 or 6' moves in response to the drive force in the reverse direction (reverse rotation), and thus requires no gears or other parts for its operation. Problems related to increased noise or cost or the like are therefore eliminated.

The above embodiments have been described with reference to a vehicle based on a front-engine/rear-wheel-drive (FR vehicle) or a front-engine/front-wheel-drive (FF vehicle) configuration, as indicated with reference to FIGS. 1 and 2. However, it shall be apparent that the drive force transmission device 28 or 28' of the present invention may be applied in a conceptually similar manner to vehicles having wheels that are not powered by an engine but are driven by an auxiliary drive source such as an electric motor or.

According to the drive force transmission device 28 or 28' of the present invention, a state is established in the cam mechanism 6 or 6', as well as in the return spring 7, whereby rotation is not transmitted to both the cam mechanism 6 or 6' and the return spring 7 when the input shaft 1 or 1' is rotated in the first rotational direction (forward direction). Therefore, relative rotation does not occur between the cam mechanism 6 or 6' and the return spring 7. Thus, sliding friction of the return spring 7 does not occur between the cam mechanism 6 or 6' and the return spring 7 when the input shaft 1' is rotated in the first rotational direction. Accordingly, transmission loss induced by the friction of the drive force transmission device 28 or 28' can thereby be reduced.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A drive force transmission device configured and arranged to transfer a drive force between an input shaft and an output shaft coaxially disposed with the input shaft, the drive force transmission device comprising:
   a first direction one-way clutch including a first input shaft side and a first output shaft side with the first direction one-way clutch side being configured and arranged to selectively connect a first force transmission path between the input shaft and the output shaft to transmit rotation in a first rotational direction;
   a second direction one-way clutch including a second input shaft side and a second output shaft side with the second direction one-way clutch side being configured and arranged to selectively connect a second force transmission path between the input shaft and the output shaft to transmit rotation in a second rotational direction that is opposite to the first rotational direction, the second direction one-way clutch being arranged with respect to the first direction one-way clutch such that the first force transmission path is in parallel with the second force transmission path;
   a second direction rotation transmission clutch being disposed between the output shaft and the second output shaft side of the second direction one-way clutch to selectively connect the second direction one-way clutch with the output shaft;
   a cam mechanism operatively coupled to the second direction rotation transmission clutch to engage the second direction rotation transmission clutch in response to rotation of the input shaft in the second rotational direction; and
   a regulating member operatively coupled to the cam mechanism to regulate movement of the cam mechanism to maintain a disengaged state of the second direction rotation transmission clutch with the cam mechanism, and the regulating member being arranged to be non-rotatable in response to rotation of the input shaft in the first rotational direction.

2. The drive force transmission device as recited in claim 1, wherein
   the first input shaft side of the first direction one-way clutch includes a first inner ring that is configured and arranged to be coupled to a first input portion of an outer periphery of the input shaft adjacent to the output shaft so that the first inner ring rotates together with the input shaft;
   the first output shaft side of the first direction one-way clutch includes a first outer ring that is configured and arranged to be coupled to the output shaft;
   the second input shaft side of the second direction one-way clutch includes a second inner ring that is configured and arranged to be coupled to a second input portion of the input shaft that is farther away from the output shaft than the first input portion so that the second inner ring rotates together with the input shaft;
   the second output shaft side of the second direction one-way clutch includes a second outer ring having a cylindrical shape;
   the second direction rotation transmission clutch is disposed between the first outer ring of the first direction one-way clutch and the second outer ring of the second direction one-way clutch; and
   the cam mechanism is disposed between the first outer ring of the first direction one-way clutch and the second outer ring of the second direction one-way clutch, the cam mechanism is disposed more adjacent to the second outer ring of the second direction one-way clutch than the second direction rotation transmission clutch.

3. The drive force transmission device as recited in claim 2, wherein
   the cam mechanism includes
      a first cam disk coupled to the second outer ring of the second direction one-way clutch so that the first cam disk rotates with the second outer ring of the second direction one-way clutch,
      a second cam disk coupled to the second direction rotation transmission clutch and biased toward the first cam disk by the regulating member, and
      a cam follower disposed between the first and second cam disks to move the second cam disk in an axial direction away from the first cam disk so as to engage the second direction rotation transmission clutch when the first cam disk is rotated in the second rotational direction.

4. The drive force transmission device as recited in claim 2, wherein
   the first direction one-way clutch further includes a plurality of first sprags disposed between the first inner ring and the first outer ring, with the first sprags being configured and arranged to prevent the first outer ring from rotating relative to the first inner ring in the first rotational direction and to allow the first outer ring to rotate relative to the first inner ring in the second rotational direction, and the second direction one-way clutch further includes a plurality of second sprags disposed between the second inner ring and the second outer ring, with the second sprags being configured and arranged to prevent the second outer ring from rotating relative to the second inner ring in the second rotational direction and to allow the second outer ring to rotate relative to the second inner ring in the first rotational direction.

5. The drive force transmission device as recited in claim 2, wherein the first direction one-way clutch further includes a plurality of first rollers disposed between the first inner ring and the first outer ring, with the first rollers being configured and arranged to prevent the first outer ring from rotating relative to the first inner ring in the first rotational direction and to allow the first outer ring to rotate relative to the first inner ring in the second rotational direction, and the second direction one-way clutch further includes a plurality of second rollers disposed between the second inner ring and the second outer ring, and with the second rollers being configured and arranged to prevent the second outer ring from rotating relative to the second inner ring in the second rotational direction and to allow the second outer ring to rotate relative to the second inner ring in the first rotational direction.

6. The drive force transmission device as recited in claim 1, wherein the second direction rotation transmission clutch includes a pair of annular clutch gear members disposed to face each other so that gears provided on opposing surfaces of the annular clutch gear members mesh each other during an engaged state of the second rotational direction rotation transmission clutch.

7. The drive force transmission device as recited in claim 1, wherein the second direction rotation transmission clutch includes a pressure plate, a clutch drum, and a plurality of inner plates and outer plates that are alternately interposed between the pressure plate and the clutch drum so that the inner and outer plates are clamped between the pressure plate and the clutch drum during an engaged state of the second direction rotation transmission clutch.

8. The drive force transmission device as recited in claim 1, wherein the second direction rotation transmission clutch includes a pair of clutch members disposed to face each other so as to be pressed against each other during an engaged state of the second direction rotation transmission clutch.

9. The drive force transmission device as recited in claim 1, wherein the first output shaft side of the first direction one-way clutch includes a first inner ring that is configured and arranged to be coupled to on an outer periphery of the output shaft so that the first inner ring rotates together with the output shaft;

the first input shaft side of the first direction one-way clutch includes a first outer ring that is configured and arranged to be coupled to the input shaft;

the second output shaft side of the second direction one-way clutch includes a second inner ring disposed on the outer periphery of the output shaft adjacent to the first direction one-way clutch, with the second inner ring being configured and arranged to rotate relative to the output shaft;

the second input shaft side of the second direction one-way clutch includes a second outer ring integrally formed with the first outer ring of the first direction one-way clutch with the second outer ring being configured and arranged to be coupled to the input shaft; and the second direction rotation transmission clutch and the cam mechanism are disposed in the second force transmission path between the second inner ring of the second direction one-way clutch and the output shaft.

10. The drive force transmission device as recited in claim 9, wherein the cam mechanism includes a first cam disk coupled to the second inner ring of the second direction one-way clutch so that the first cam disk rotates with the second inner ring of the second direction one-way clutch, a second cam disk disposed adjacent to the second direction rotation transmission clutch and biased toward the first cam disk by the regulating member, and a cam follower disposed between the first and second cam disks to move the second cam disk in an axial direction away from the first cam disk so as to engage the second direction rotation transmission clutch when the first cam disk is rotated in the second direction.

11. The drive force transmission device as recited in claim 9, wherein the first direction one-way clutch further includes a plurality of first sprags disposed between the first inner ring and the first outer ring, with the first sprags being configured and arranged to prevent the first outer ring from rotating relative to the first inner ring in the first rotational direction and to allow the first outer ring to rotate relative to the first inner ring in the second rotational direction, and the second direction one-way clutch further includes a plurality of second sprags disposed between the second inner ring and the second outer ring, with the second sprags being configured and arranged to prevent the second outer ring from rotating relative to the second inner ring in the second rotational direction and to allow the second outer ring to rotate relative to the second inner ring in the first rotational direction.

12. A drive force transmission device configured and arranged to transfer a drive force between an input shaft and an output shaft coaxially disposed with the input shaft, the drive force transmission device comprising:

first direction force transmitting means for selectively connecting a first force transmission path to transmit rotation of the input shaft in a first rotational direction to the output shaft;

second direction force transmitting means for selectively connecting a second force transmission path to transmit rotation of the input shaft in a second rotational direction to the output shaft with the first force transmission path being in parallel with the second force transmission path;

second direction rotation transmission means for selectively connecting the second direction force transmitting means with the output shaft;

motion transforming means for engaging the second direction rotation transmission means in response to rotation of the input shaft in the second rotational direction; and regulating means for regulating movement of the motion transforming means to maintain a disengaged state of the second direction rotation transmission means with the motion transforming means, without the regulating means being rotated in response to rotation of the input shaft in the first rotational direction.

13. A method of transferring a drive force between an input shaft and an output shaft coaxially disposed with the input shaft, the method comprising:

selectively engaging a first direction one-way clutch that connects a first force transmission path to transmit rotation of the input shaft in a first rotational direction to the output shaft;

selectively engaging a second direction one-way clutch that connects a second force transmission path that is in parallel with the first force transmission path to transmit rotation of the input shaft in a second rotational direction to the output shaft;

selectively engaging a second direction rotation transmission clutch disposed between the second direction one-way clutch and the output shaft;

selectively operating a cam mechanism to engage the second direction rotation transmission clutch in response to the rotation of the input shaft in the second rotational direction; and regulating movement of the cam mechanism using a regulating member to maintain a disengaged state of the second direction rotation transmission clutch with the cam mechanism, without the regulating member being rotated in response to rotation of the input shaft in the first rotational direction.

* * * * *